United States Patent
Matoba et al.

[11] Patent Number: 5,594,884
[45] Date of Patent: Jan. 14, 1997

[54] CACHE MEMORY SYSTEM HAVING A PLURALITY OF PORTS

[75] Inventors: Tsukasa Matoba, Kawasaki; Hiroyuki Satou, Tokyo, both of Japan

[73] Assignee: Kabushiki Kaisha Toshiba, Kawasaki, Japan

[21] Appl. No.: 170,766

[22] Filed: Dec. 21, 1993

[30]   Foreign Application Priority Data

Dec. 22, 1992 [JP] Japan ................................... 4-342125
Feb. 26, 1993 [JP] Japan ................................... 5-038186

[51] Int. Cl.$^6$ ..................................................... G06F 12/08
[52] U.S. Cl. ........................... 395/452; 395/458; 395/464; 364/DIG. 1; 364/243.42
[58] Field of Search ........................... 395/400, 425, 395/450, 452, 458, 467, 476, 375

[56]   References Cited

U.S. PATENT DOCUMENTS

| | | | |
|---|---|---|---|
| 5,177,706 | 1/1993 | Shinohara et al. | 365/189.04 |
| 5,274,790 | 12/1993 | Suzuki | 395/425 |
| 5,287,465 | 2/1994 | Kurosawa | 395/375 |
| 5,287,467 | 2/1994 | Blaner et al. | 395/375 |
| 5,313,587 | 5/1994 | Patel et al. | 395/275 |
| 5,434,989 | 7/1995 | Yamaguchi | 395/403 |
| 5,465,344 | 11/1995 | Hirai et al. | 395/458 |

*Primary Examiner*—Eddie P. Chan
*Assistant Examiner*—Hiep T. Nguyen
*Attorney, Agent, or Firm*—Cushman Darby & Cushman, L.L.P.

[57]   ABSTRACT

An instruction cache and a data cache are formed with a 2-port structure, the first port of the instruction cache is exclusively used for readout of the contiguous instruction, and the second port thereof is exclusively used for readout of the branched instruction when the conditional branch instruction is executed. With this construction, two instructions which may be executed can be simultaneously fetched irrespective of whether the branch of the conditional branch instruction is taken or untaken, thereby making it possible to enhance the CPU performance. Further, in the 2-port data cache, time for the cache refill process can be reduced by means of the contiguous data transfer and non-cacheable access.

2 Claims, 15 Drawing Sheets

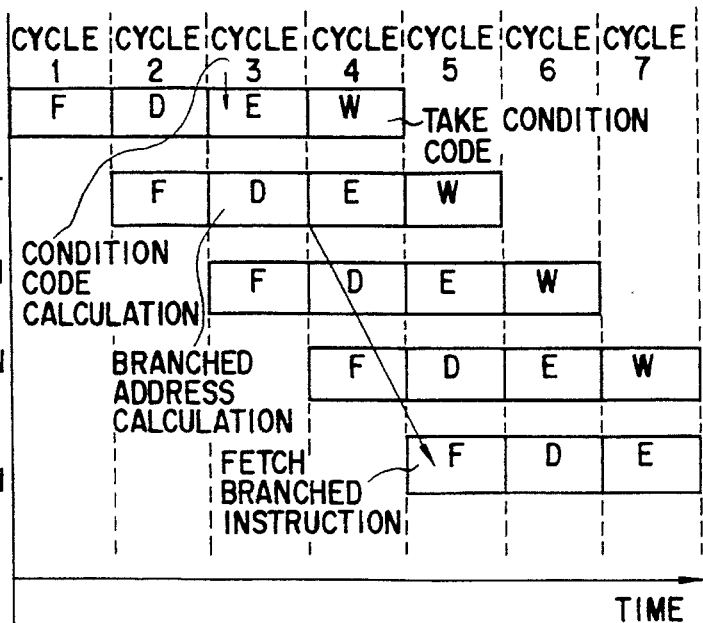
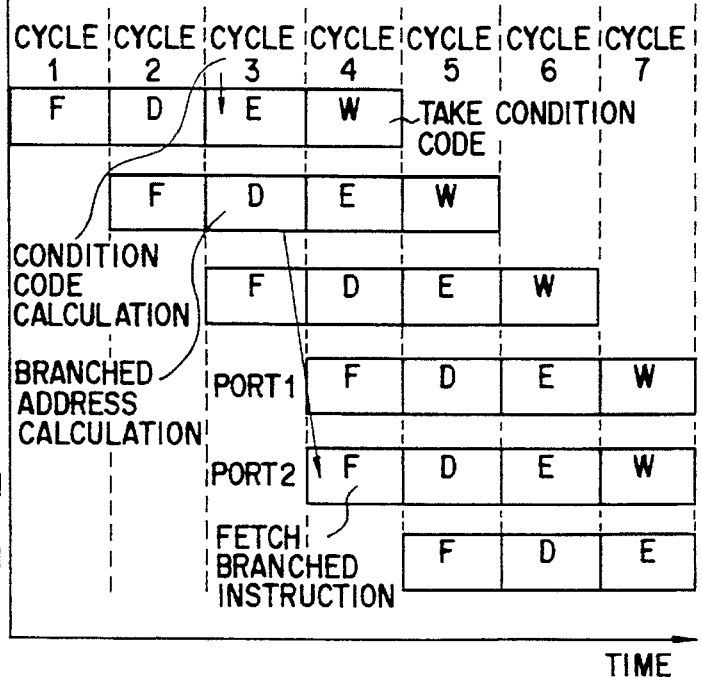

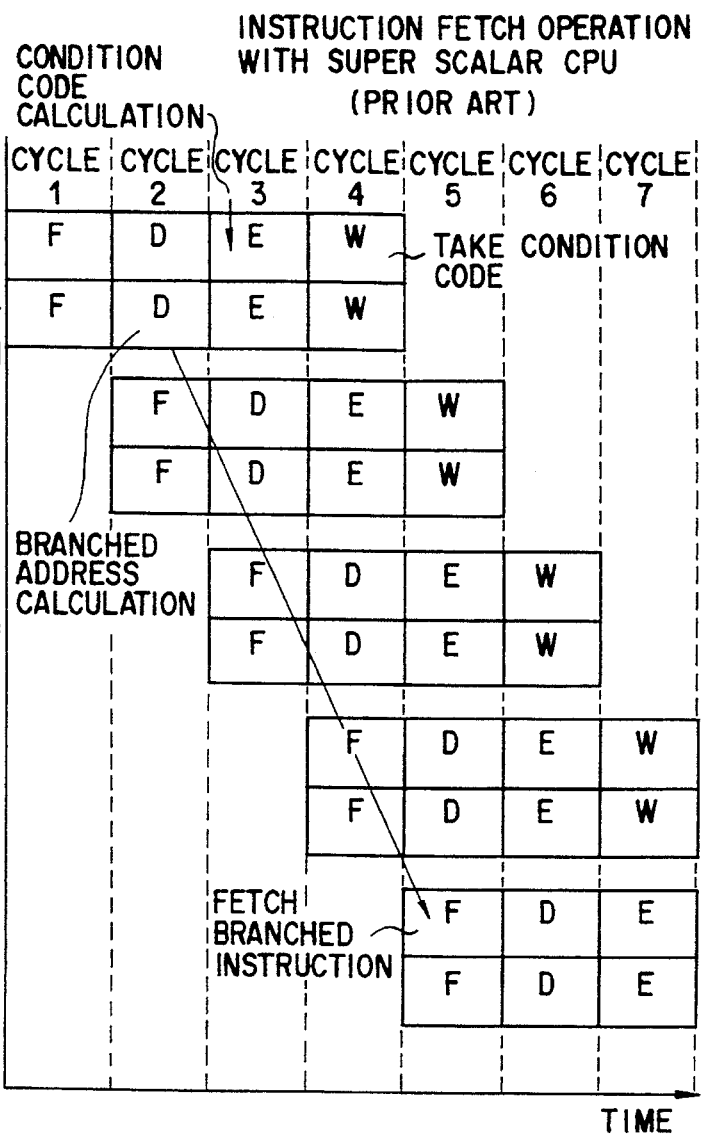

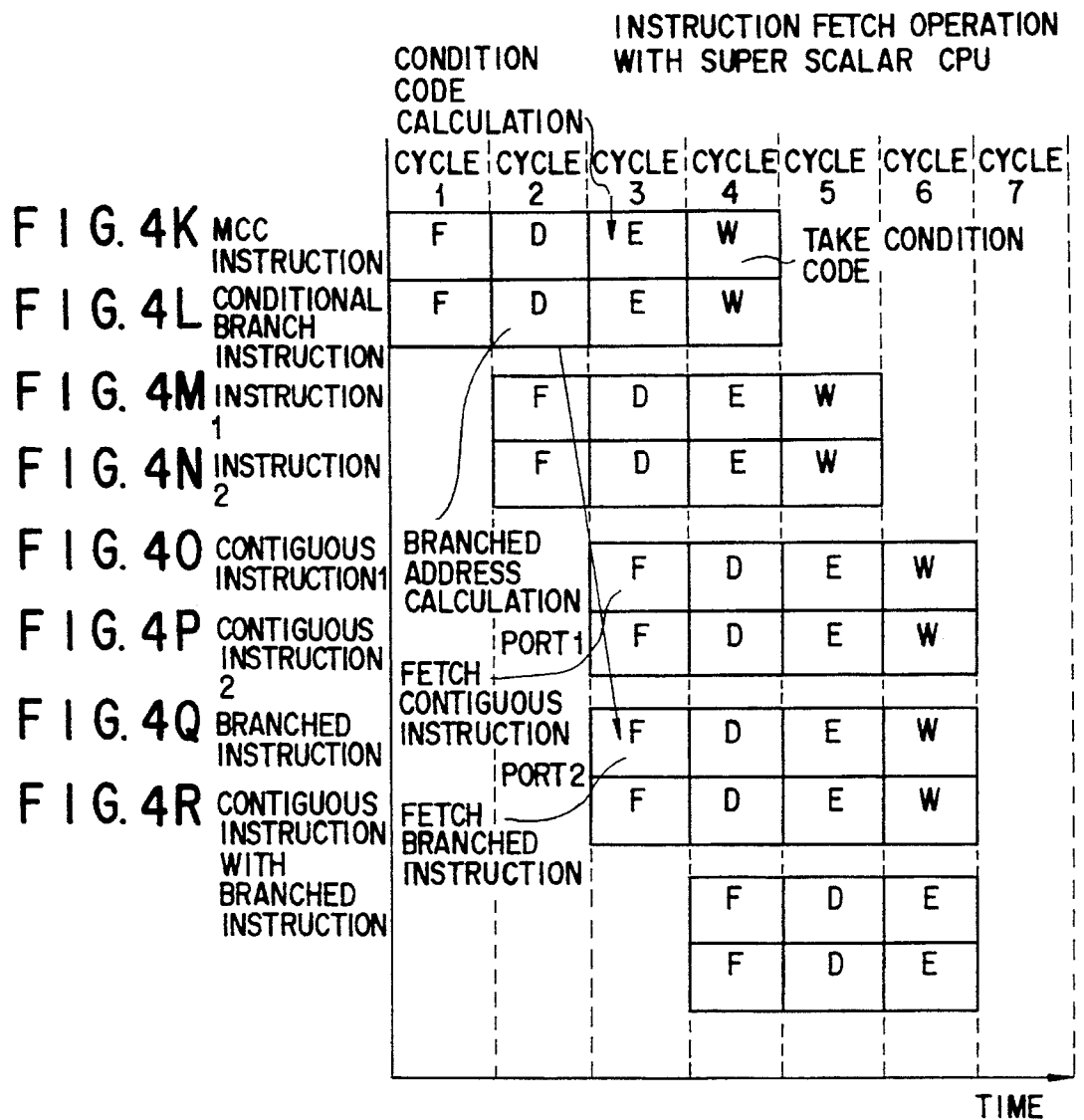

|  | CYCLE 1 | CYCLE 2 | CYCLE 3 | CYCLE 4 | CYCLE 5 | CYCLE 6 | CYCLE 7 |
|---|---|---|---|---|---|---|---|
|  |  |  | INSTRUCTION FETCH OPERATION |  |  |  |  |
| FIG. 5A  MCC INSTRUCTION | F | D | E (CONDITION CODE CALCULATION) | W (TAKE CONDITION CODE) |  |  |  |
| FIG. 5B  CONDITIONAL BRANCH INSTRUCTION |  | F | D (BRANCHED ADDRESS CALCULATION) | E | W |  |  |
| FIG. 5C  CONTIGUOUS INSTRUCTION 1 |  |  | F | D | E | W |  |
| FIG. 5D  CONTIGUOUS INSTRUCTION 2 (PORT 1, FETCH CONTIGUOUS INSTRUCTION) |  |  |  | F | D | E | W |
| FIG. 5E  BRANCHED INSTRUCTION (PORT 2, FETCH BRANCHED INSTRUCTION) |  |  |  | F | D | E | W |
| | | | | | F | D | E |

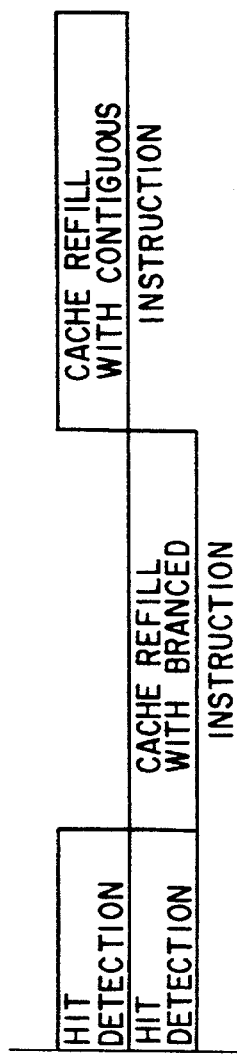
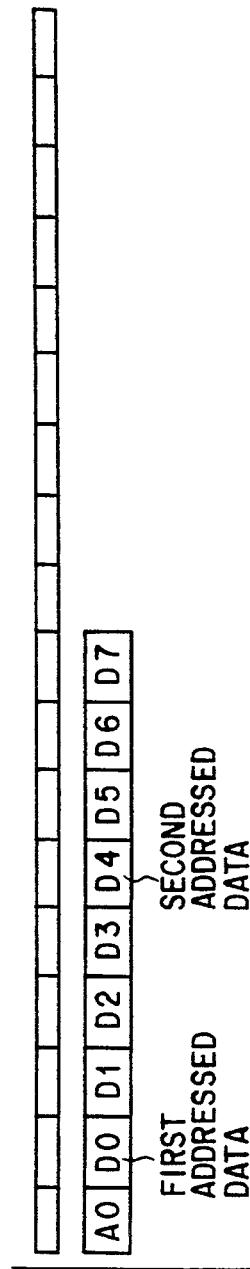
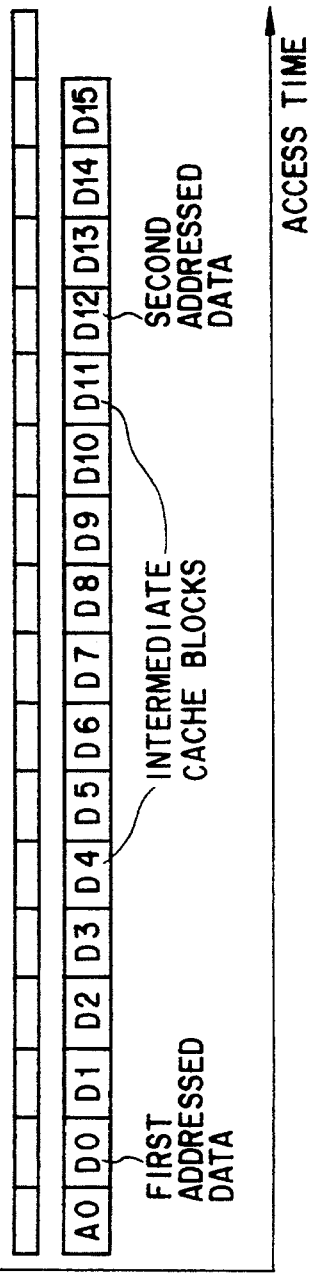

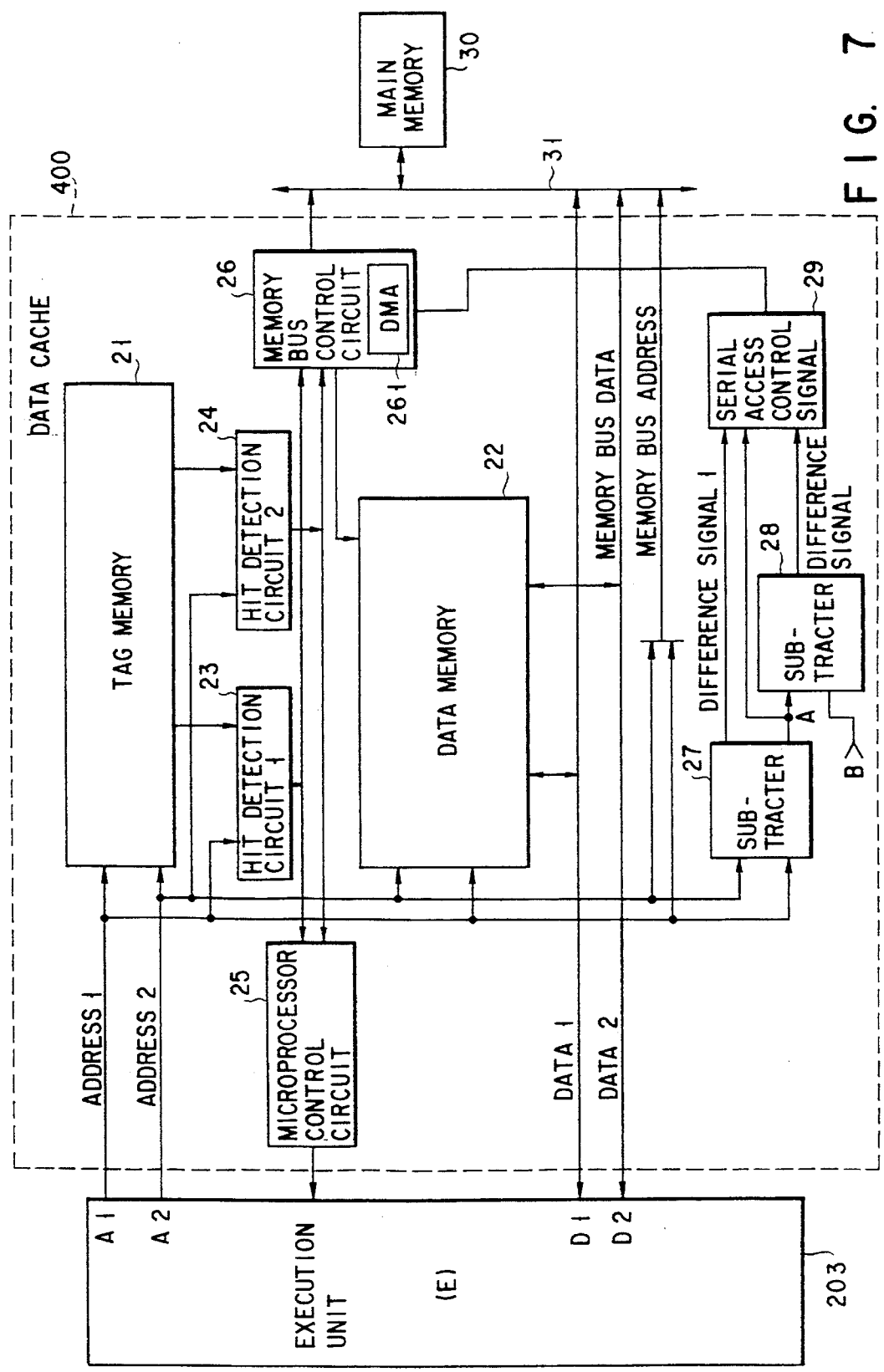

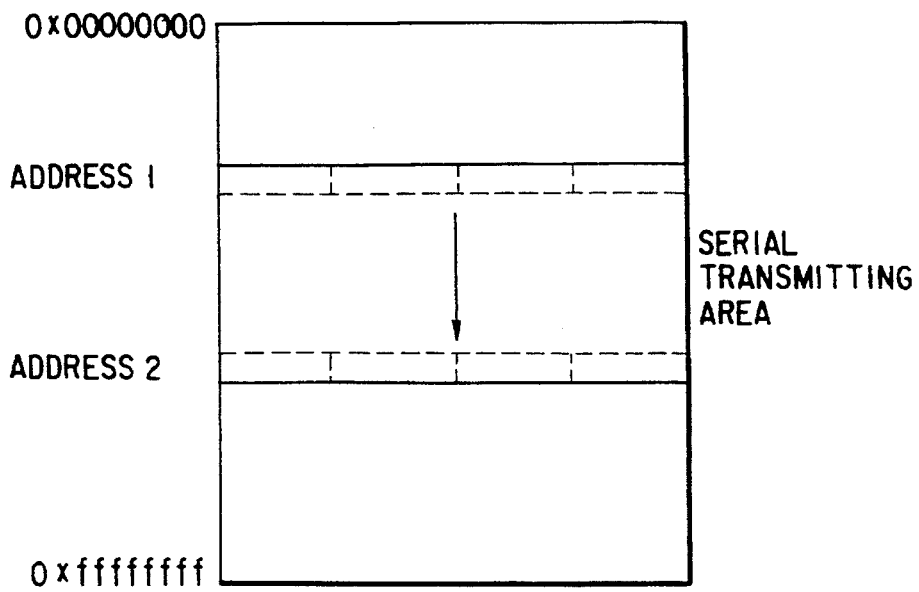
PREDETERMINED VALUE B ≧ (ADDRESS2 - ADDRESS1) ≧ 0
F I G. 9
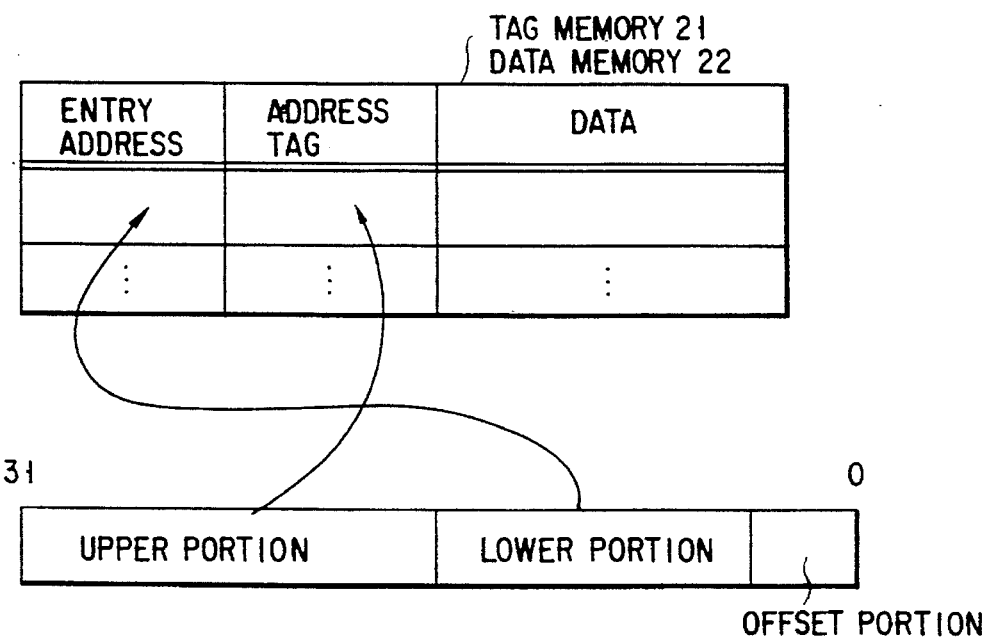
F I G. 13

CACHE MEMORY SYSTEM HAVING A PLURALITY OF PORTS

BACKGROUND OF THE INVENTION

1. Field of the Invention

This invention relates to a cache memory system provided in a microprocessor, and more particularly to a cache memory system having a plurality of ports.

2. Description of the Related Art

In recent years, the processing speed of electronic computers have dramatically increased. Particularly, the performance of microprocessors used as CPU's (Central Processing Units) of electronic computers have markedly improved because of the development of the semiconductor technology.

In recent CPU's, in order to enhance the efficiency of the instruction execution process, instruction pipeline systems are commonly employed. The instruction pipeline system is a system for dividing execution of the instruction into a plurality of stages such as an instruction fetch cycle, decode cycle, execution cycle, and data write-in cycle, and executing a plurality of instructions in a stepwise manner with the instructions partly overlapped. Since, in this system, an instruction is fetched before execution of a preceding instruction is completed, an instruction prefetch process is effected. The instruction prefetch process consists of fetching an instruction to be executed in the future while simultaneously decoding and executing the preceding instruction.

Thus, in order to cause the CPU to process a plurality of instructions in a pipeline parallel manner, high-speed readout of instructions and data readout/write-in operations with respect to the main memory are required.

Therefore, it is a common practice for the recent microprocessor to separately have an instruction cache and a data cache. The instruction cache is a cache memory exclusively used for instruction words and the data cache is a cache memory exclusively used for data fetched according to an operand of the instruction. It becomes possible to simultaneously access both instructions and data at high speeds by separately providing the instruction cache and data cache.

In the above microprocessor, access to the instruction cache is as follows.

Since the conventional instruction cache has only one port for instruction readout, the CPU sequentially updates an instruction fetch address and serially reads out a group of instructions successively stored in an address order one by one. Normally, since the order of the instructions executed by the CPU coincides with the order in which the instructions are stored in the instruction cache, the prefetch of an instruction from the instruction cache can be efficiently effected.

However, when a conditional branch instruction is executed by the CPU, the following problem occurs. In this case, since whether the branch condition is taken or untaken is not determined until execution of a condition code change instruction lying before the conditional branch instruction is completed, fetch of the branched instruction is delayed accordingly. This is because the instruction to be next executed depends on whether the branch condition is taken or untaken. Such delays inherent in the fetch of branched instructions significantly degrades the performance of the CPU.

To abrate the degradation in the performance of the CPU caused by the conditional branch instruction, the following two methods are known.

One of them is a method using branch prediction. In this method, rather than waiting for the determination of a condition code on which the conditional branch depends, the branch address is decoded in advance and the branched instruction is read out rather than the next instruction in address order.

However, this method has a problem that the degree of degradation (penalty) in CPU performance caused when the prediction is wrong is large and it is not highly practicable.

The second method employs a branched instruction buffer. This method is based on the fact that most of the branches are used in a loop process and involves previously storing a pair of a address consisting of the conditional branch instruction and the branched instruction in an exclusive branched instruction buffer provided separately from the instruction cache This saves the CPU from having to newly fetch the same branch instruction after every loop iteration.

However, this method requires large-scale and complicated hardware to ensure coincidence between the contents of the buffer and the instruction cache.

As described above, the conventional instruction cache is effective when instructions which are successive in an address order are read out, but has a defect that it takes a long time to read out a branched instruction when a conditional branch instruction is provided, thereby lowering the performance of the CPU.

Further, a microprocessor for executing two or more successive instructions in the same cycle has recently become more prevalent. This is called a super scalar type.

The super scalar type microprocessor can enhance performance by several times without enhancing the operation clock frequency. Therefore, this type of microprocessor can be widely used in a range of systems from a small-sized computer such as a personal computer or work station to a large-scale computer used as a host computer.

The super scalar type microprocessor has hardware for dividing a plurality of instructions fetched to the microprocessor into operation instructions, branch instructions, memory access instructions and the like and determining whether the instruction pair can be simultaneously executed. Further, in the recent super scalar type microprocessor, use of a data cache of 2-port structure is considered to simultaneously execute two memory access instructions.

In the normal program, the frequency of occurrence of memory access instructions (load/store instructions) is as high as 20 to 30%. Therefore, simultaneous execution of two memory access instructions may largely contribute to enhancement of the performance of the computer.

When a 2-port type data cache is used, execution of two memory access instructions is completed in one cycle if cache hit occurs on both of the two memory access instructions to be simultaneously executed. When a cache miss occurs in at least one of the memory access instructions, cache refill is effected.

In this case, the cache refill means the operation of transferring data from the main memory to the cache memory at the time of cache miss so as to exchange the contents of the cache memory.

That is, when a cache miss occurs in at least one of the accesses, the operation of the CPU of the microprocessor is interrupted until data is fetched from the main memory into the data cache by the cache refill process.

Thus, since the operation of the CPU is interrupted in the cache refill process, it is necessary to reduce time required for the cache refill to minimum possible time in order to prevent degradation of the performance of the CPU.

However, since only one memory bus is used to access the main memory, it becomes impossible to simultaneously effect the cache refill processes for the two memory access instructions. For this reason, if a cache miss occurs in both of the two memory access instructions to be simultaneously executed, the cache refill process for the memory access instructions must be effected as a bus transaction which is independent for each instruction.

Generally, in the main memory access via the memory bus, memory bus adjustment time for attaining the right of use of the bus is necessary. Therefore, the memory bus adjustment time is always inserted between two independent main memory accesses for the cache refill process. This causes an increase in time required for the cache refill, thereby lowering the performance of the CPU.

Further, when the CPU simultaneously executes two memory access instructions, different memory address values of the instructions sometimes compete on the same entry address of the data cache. In this case, the entry address indicates a lower address accessed by the CPU. The bit width of the lower address is determined according to the physical memory structure of the data cache.

Thus, even when two memory addresses compete on the same entry address of the data cache, the cache refill process for the two memory addresses is effected as an independent bus transaction as described before.

In this case, the cache refill for an instruction of high priority execution order is first effected, and then, the cache refill for an instruction of low priority execution order is effected. That is, data on a specified entry which has been exchanged by the cache refill effected in a preceding cycle is exchanged for different data by the cache refill effected in the next cycle. Therefore, the cache memory access for the first cache refill becomes a useless access operation and extra time is used for the useless access operation.

As described above, the 2-port structure data cache is suitable for enhancing the performance of the CPU by simultaneously inputting/outputting two data items, but has a defect that a long time is used for the cache refill.

The 2-port structure may be used in the above-described instruction cache. With this structure, two instructions can be simultaneously read out into the CPU so that the instruction readout efficiency can be enhanced.

However, even if the instruction cache is formed in a 2-port form, a next instruction cannot be read out until the branch condition is determined in a case where a different instruction is read out from the cache depending on whether the branch condition is taken or not as in the conventional case, and therefore, it is difficult to solve the problem that the performance of the CPU is lowered by the conditional branch instruction.

SUMMARY OF THE INVENTION

An object of this invention is to provide a cache memory system of plural-port structure capable of preventing degradation in CPU performance caused by a conditional branch instruction in an instruction cache and reducing time required for cache refill in a data cache thereby enhancing CPU performance by realizing an optimum structure for permitting the instruction cache and data cache to be formed with plural-port structure.

In order to achieve the object, according to a first aspect of this invention, a cache memory system for storing part of a group of instructions executed by a CPU, comprises a plural-port type instruction cache memory having a first instruction readout port for sequentially reading out instructions which are successive in an address order to the CPU and a second instruction readout port for reading out a branched instruction designated by the branched address of a conditional branch instruction to the CPU, and constructed to permit the first and second instruction readout operations to be simultaneously effected in response to the instruction fetch operation of the CPU; and means for accessing the instruction cache memory so as to permit an instruction succeeding the conditional branch instruction in an address order and the branched instruction of the conditional branch instruction to be simultaneously read out from the instruction cache memory via the first and second instruction readout ports when the conditional branch instruction is fetched to the CPU.

In a cache memory system, an instruction cache memory into which an instruction fetched by a CPU is stored has first and second instruction readout ports, the first port is used for the contiguous instruction access, and the second port is used for the branched instruction access of the conditional branch instruction. Therefore, when the CPU executes the conditional branch instruction, instructions which may be next executed by the CPU can be simultaneously read out by use of the two ports of the instruction cache memory irrespective of whether the branch is taken or untaken. As a result, the performance penalty due to prediction failure becomes less in comparison with the conventional branch prediction and the hardware can be less complicated in structure in comparison with the branch instruction buffer mechanism.

Further, when a cache miss occurs in both of the accesses to the two ports, the access of the branched instruction is first processed in this invention. This is because the possibility that the conditional branch instruction is taken is generally extremely higher than the possibility that it is untaken. The reason is that when the loop process is mechanically converted by use the high level language compile, the conversion is often made such that completion of the loop is determined when the condition of the conditional branch is untaken. Therefore, when a cache miss occurs while attempting to fetch both the instruction of a next address succeeding the address of the conditional branch instruction and branched instruction, since the possibility of occurrence of the branched case is higher, the performance can be enhanced by first processing the cache refill of the branched instruction.

According to a second aspect of this invention, a cache memory system for storing part of a group of data items input/output by a CPU, comprises a plural-port type data cache memory having first and second data input/output ports for data input/output, and constructed to permit first and second data input/output operations corresponding to first and second memory access instructions simultaneously executed by the CPU to be simultaneously effected via the first and second data input/output ports; hit detection means for detecting a cache miss/cache hit of each of the first and second memory access instructions according to first and second memory addresses designated by the first and second memory access instructions; subtracting means for subtracting the second memory address value from the first memory address value to derive an address difference between the memory addresses; and access control means for making main memory access in which the memory address of one of the first and second memory access instructions is used as a top address and a size corresponding to the address difference derived by the subtracting means is set as a data transfer length so as to permit data transfer for the cache refill for both of the first and second memory access instructions to be effected by one main memory access when the hit detection means has detected that a cache miss occurs in both of the first and second memory access instructions.

In the cache memory system, when a cache miss occurs in both of the first and second memory access instructions, the main memory access in which the memory address value of one of the first and second memory access instructions is used as a top address and a size corresponding to an address difference therebetween is used as a data transfer length is effected according to the address difference derived by subtracter means without independently effecting accesses twice to the main memory for cache refill for both of them. Thus, a data block containing data corresponding to both of the first and second memory addresses is transferred by block transfer from the main memory to the data memory and data transfer for the cache refill for both of the first and second memory access instructions is effected by one main memory access. As a result, the main memory access is effected only once for the cache refill of the data cache, and in comparison with a conventional case wherein main memory accesses are independently effected twice, the number of insertions of adjustment time necessary for acquiring the bus is reduced, thereby making it possible to considerably reduce time required for the cache refill process. As a result, the stand-by time of the CPU caused at the time of occurrence of a cache miss can be reduced, thus making it possible to enhance the operation performance of the CPU.

According to a third aspect of the invention, a cache memory system for storing part of a group of data items input/output by a CPU, comprises a plural-port type data cache memory having first and second data input/output ports for data input/output, and constructed to permit first and second data input/output operations corresponding to first and second memory access instructions simultaneously executed by the CPU to be simultaneously effected via the first and second data input/output ports; hit detection means for detecting a cache miss/cache hit of each of the first and second memory access instructions according to first and second memory addresses designated by the first and second memory access instructions; address detection means for comparing the first and second memory addresses with each other and detecting whether or not the memory address values specify the same entry of the data cache memory according to the result of comparison; and access control means for effecting the cache refill for only one of the first and second memory access instructions in response to a detection output of the address detection means which indicates that the first and second memory address values specify the same entry of the data cache memory when the hit detection means has detected that a cache miss occurs in both of the first and second memory access instructions.

In the cache memory system, whether the memory address values of the first and second memory access instructions specify the same entry of the data memory or not is checked, and if they compete on the same entry, the cache refill only for one of the two memory access instructions is effected and the cache refill for the other instruction is inhibited, and non-cacheable access is effected, for example. Therefore, in comparison with a case wherein the cache refill for both of the two memory access instructions is effected, the whole time required for the cache refill can be reduced, thereby enhancing the CPU performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A to 3E are timing charts for illustrating a fetch operation of prior art, FIGS. 3F to 3K are timing charts for illustrating a first example of the instruction fetch operation of the 2-port type instruction cache shown in FIG. 2;

FIGS. 4A to 4J are timing charts for illustrating a fetch operation in a super scalar type CPU of prior art, FIGS. 4K to 4R are timing charts for illustrating a second example of the instruction fetch operation of the 2-port type instruction cache shown in FIG. 2;

FIGS. 5A to 5E are timing charts for illustrating a third example of the instruction fetch operation of the 2-port type instruction cache shown in FIG. 2;

FIGS. 6A and 6B are timing charts for illustrating the cache refill operation of the 2-port type instruction cache shown in FIG. 2;

FIG. 7 is a block diagram showing an example of the concrete construction of a 2-port type data cache provided in the cache memory system shown in FIG. 1;

FIGS. 8A and 8B are timing charts for illustrating the cache refill operation of the 2-port type data cache shown in FIG. 7;

FIG. 9 is a block diagram showing an example of a main memory device to which data is transferred for the cache refill operation of the 2-port type data cache shown in FIG. 7;

FIG. 13 is a block diagram showing a rough relation between data stored in the tag memory and data memory and an address output from the execution unit shown in FIG. 10;

DETAILED DESCRIPTION OF THE PREFERRED EMBODIMENTS

Figure 1:
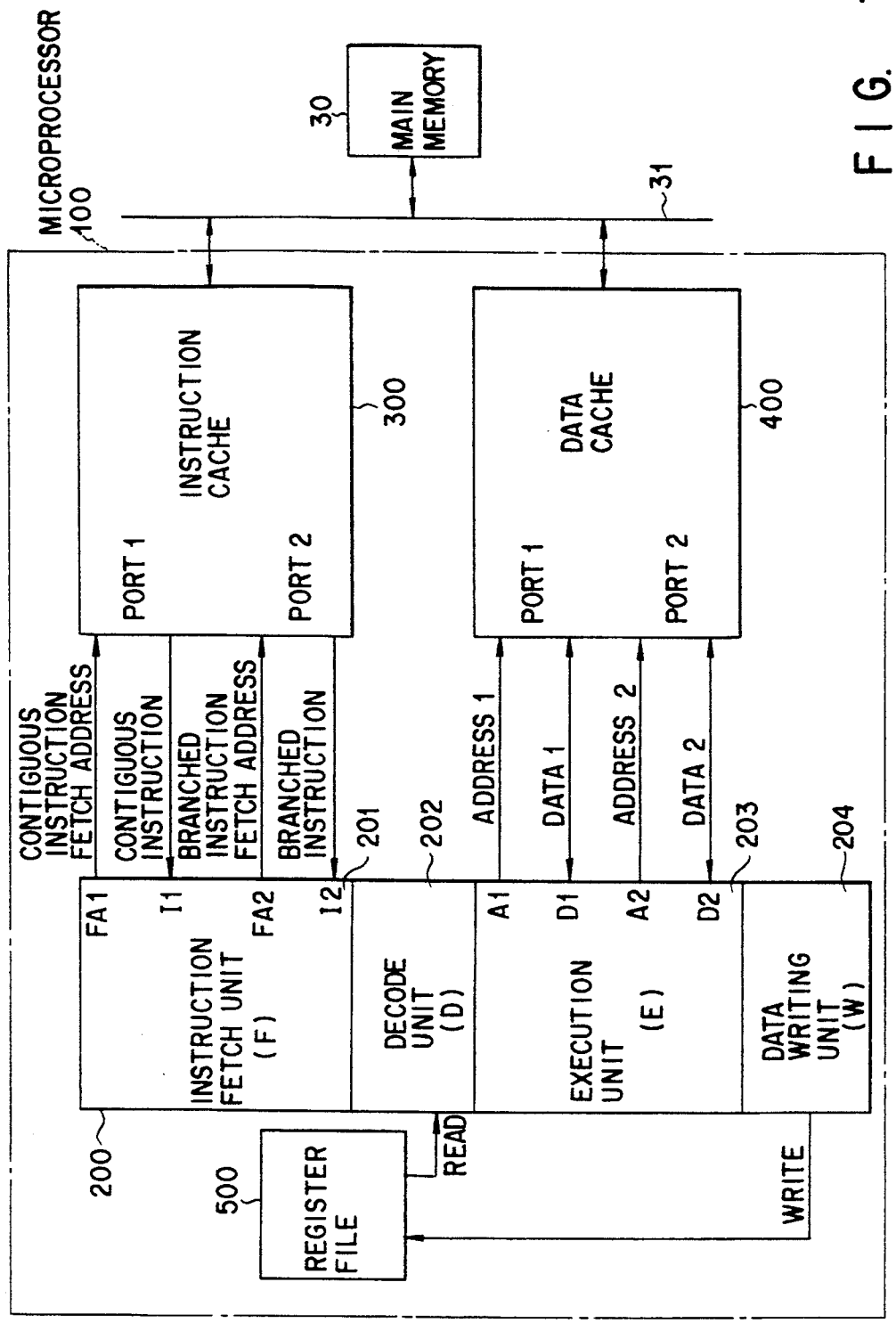
FIG. 1 is a block diagram showing an example of the entire construction of a microprocessor having a cache memory system of this invention.

There will now be described an embodiment of this invention with reference to the accompanying drawings. First, the entire construction of a microprocessor using a cache memory system of this invention is explained with reference to FIG. 1.

The microprocessor 100 is a RISC (reduce instruction set computer) type microprocessor and is based on the SPARK architecture of SUN MICROSYSTEMS Co. The microprocessor 100 includes a CPU (central processing unit) core unit 200, 2-port type instruction cache 300, 2-port type data cache 400, and register file 500.

The 2-port type instruction cache 300 stores part of instructions executed by the CPU core unit 200 and has first and second instruction readout ports. The instruction readout operations using the two instruction readout ports can be simultaneously effected and two instructions can be simultaneously read out.

In this case, the first instruction readout port of the instruction cache is used to read out a contiguous instruction in an address order from the instruction cache 300 and the second instruction readout port thereof is used to read out a branched instruction specified by a branched address from the instruction cache 300 when a conditional branch instruction is fetched to the CPU core unit 200.

The 2-port type data cache 400 stores part of an operand input or output by the CPU core unit 200 and has first and second data input/output ports. The data input/output operations using the two data input/output ports can be simultaneously effected and two data items can be simultaneously read out or written.

The CPU core unit 200 generally indicates all of the units in the microprocessor 100 except the instruction cache 300, data cache 400 and register file 500 and is constructed with divided portions of an instruction fetch unit 201, instruction decode unit 202, instruction execution unit 203 and data write-in unit 204 which can be independently operated to construct a 4-stage pipeline including an instruction fetch stage (F), decode stage (D), execution stage (E) and data write-in stage (W).

In the instruction fetch stage (F) by the instruction fetch unit 201, the retrieval of the instruction cache 300 for sequentially fetching contiguous instructions in an address order is normally effected. That is, a contiguous instruction fetch address is output from the address output port FA1 of the instruction fetch unit 201 and supplied to the first port of the instruction cache 300. When a hit occurs in the instruction cache 300, an instruction specified by the contiguous instruction fetch address is read out from the first port of the instruction cache 300 and supplied to the instruction input port I1 of the instruction fetch unit 201. When no instruction is present (a miss occurs) in the instruction cache 300, cache refill which is an updating sequence of the instruction cache 300 is effected and the state of the instruction fetch stage is kept until the updating operation is completed. In the cache refill, a new instruction is transferred to the instruction from the main memory 30 via the memory bus 31.

Further, when a conditional branch instruction is fetched to the instruction fetch unit 201, instructions which may be next executed by the CPU core unit 300 are simultaneously read out by use of the two ports of the instruction cache memory irrespective of whether the branch is taken or untaken in the instruction fetch stage (F) by the instruction fetch unit 201.

That is, in the instruction fetch stage (F), retrieval of the instruction cache 300 for reading out a branched instruction of the conditional branch instruction is effected in parallel with the retrieval of the instruction cache 300 using the contiguous instruction fetch addresses. The retrieval for readout of the branched instruction is effected as follows by using the second port of the instruction cache 300.

That is, the branched address is output from the address output port FA2 of the instruction fetch unit 201 and supplied to the second port of the instruction cache 300. When a hit occurs in the instruction cache 300, a branched instruction is read out from the second port of the instruction cache 300 and supplied to the instruction input port I2 of the instruction fetch unit 201. When no instruction is present (a miss occurs) in the instruction cache 300, cache refill which is an updating sequence of the instruction cache 300 is effected and the state of the instruction fetch stage is kept until the updating operation is completed.

In the instruction decode stage (D) by the instruction decode unit 202, the fetched instruction is decoded, and calculation of a branched address of the conditional branch instruction and calculation of an operand address of a Load/Store instruction are effected. After the instruction decode stage (D), the instruction execution stage (E) is generally effected, and in the case of conditional branch instruction, the instruction fetch stage (F) is started immediately after the branch address is calculated and retrieval of the instruction cache 300 using the contiguous instruction fetch addresses and retrieval of the instruction cache 300 using the branched address can be simultaneously effected. Further, when the instruction execution stage (E) is started, readout of a register source operand from the register file 500 is also effected.

In the instruction execution stage (E), various operations specified by the instructions are effected. Further, retrieval of the data cache 400 is effected in response to the Load/Store instruction.

In a case where the microprocessor 100 is a super scalar type processor for simultaneous execution of two instructions, retrieval of the data cache 400 in the instruction execution stage (E) is effected as follows. That is, in the case of the super scalar type processor for simultaneous execution of two instructions, two instructions are simultaneously processed in each stage of the pipeline, and two instructions are simultaneously processed in the process for the Load/Store instruction in the instruction execution stage (E).

For example, when two Load instructions are executed, two operand addresses (address 1, address 2) specified by the Load instructions are simultaneously output from the address output ports A1, A2 of the execution unit 203 and supplied to the first and second ports of the data cache 400. An operand (data 1) designated by the operand address 1 is read out from the first port of the data cache 400 and supplied to the data input/output port D1 of the execution unit 203. Further, an operand (data 2) designated by the operand address 2 is read out from the second port of the data cache 400 and supplied to the data input/output port D2 of the execution unit 203.

In the data write-in stage (W) by the data write-in unit 204, the operation result and Load instruction operand are stored in the register file 500.

Next, the detail of the instruction cache 300 which is the first feature of this invention is explained with reference to FIGS. 2 to 5E.

Figure 2:
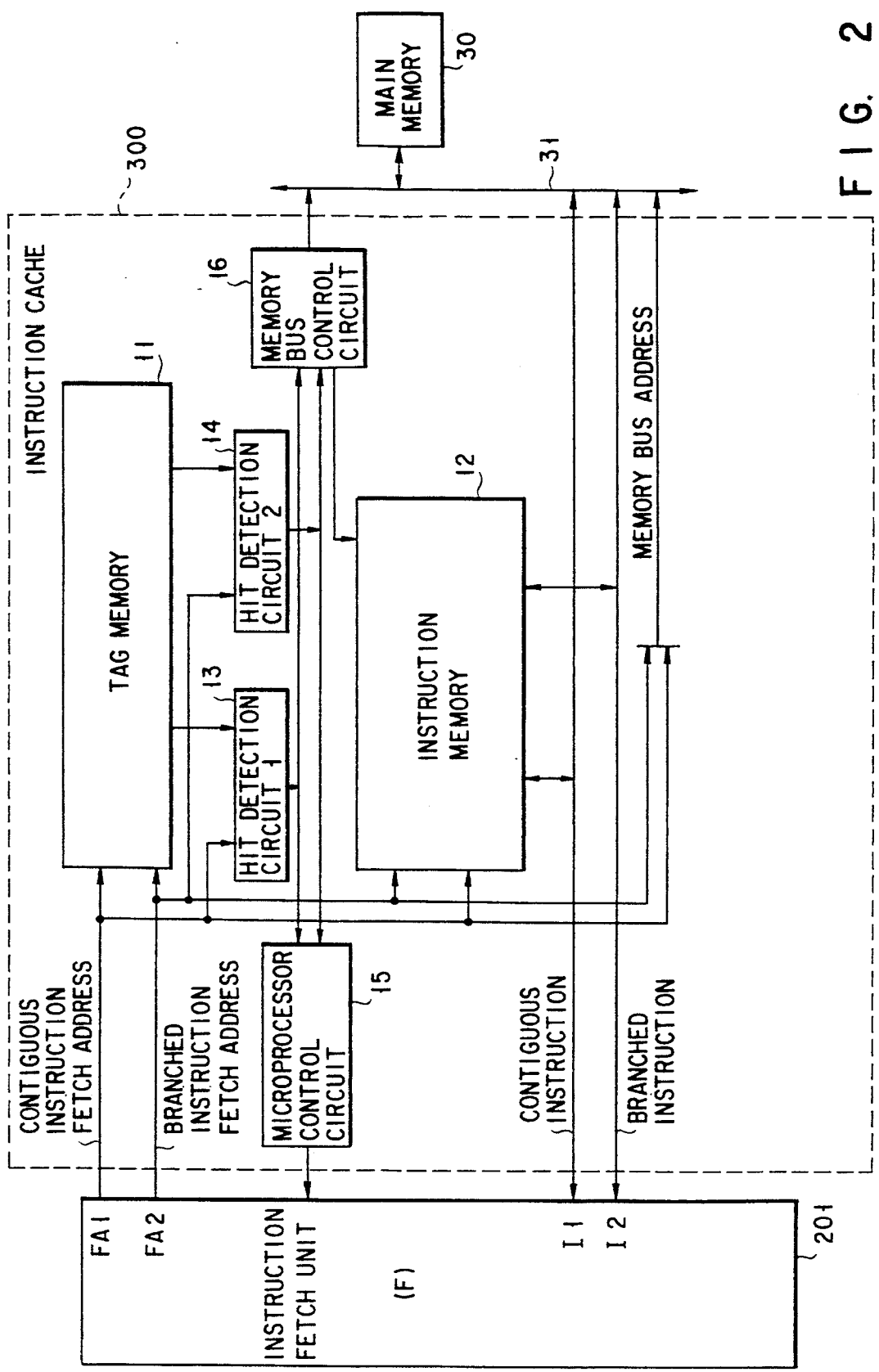
FIG. 2 is a block diagram showing an example of the concrete construction of a 2-port type instruction cache shown in FIG. 1.

In FIG. 2, an example of the concrete construction of the instruction cache 300 is shown. The instruction cache 300 is a 2-port cache as described before, and the first port thereof is used for readout of a contiguous instruction and the second port thereof is used for readout of a branched instruction. The instruction cache 300 includes a tag memory 11, instruction memory 12, first and second hit (HIT) detection circuits 13, 14, microprocessor control circuit 15, and memory bus control circuit 16.

The tag memory 11 is used as a directory memory for indicating an address of the main memory 30 corresponding to an instruction held in the instruction memory 12. The tag memory 11 has entries of a number equal to the entry number (block number) of the instruction memory 12, and in each entry, a block address, valid bit and the like are stored. The block address indicates an instruction of a block of the main memory 30 which corresponds to an instruction of a corresponding block of the instruction memory 12. The valid bit indicates whether the instruction of a corresponding block of the instruction memory 12 is valid or not.

The tag memory 11 is a 2-port memory and can simultaneously receive two types of instruction fetch addresses (contiguous instruction fetch address, branched instruction fetch address) output from the instruction fetch unit 201. That is, the lower bits of the contiguous instruction fetch address and branched instruction fetch address output from the instruction fetch unit 201 are input to the tag memory 11 and two types of block addresses stored in the entries designated by the addresses are simultaneously read out.

The instruction memory 12 is a memory for holding part of data in the main memory 30 and is constructed by entries (blocks) of the same number as the entry number of the tag memory 11. The data memory 12 is also a 2-port memory and can receive two types of instruction fetch addresses (contiguous instruction fetch address, branched instruction fetch address) output from the instruction fetch unit 201. That is, the lower bits of the contiguous instruction fetch address and branched instruction fetch address output from the instruction fetch unit 201 are input to the instruction memory 12 and instructions in the entries designated by the addresses are to be read out or written.

The first hit (HIT) detection circuit 13 is a circuit for detecting the cache miss/cache hit for the contiguous instruction fetch address output from the first address output port FA1 of the instruction fetch unit 201 and functions to compare the block address read out from the tag memory 11 with the upper bits of the contiguous instruction fetch address, output a hit signal indicating the cache hit when the result of comparison indicates coincidence, and output a miss hit signal indicating the cache miss when the result of comparison indicates non-coincidence. The signal is supplied to both of the microprocessor (CPU core unit) control circuit 15 and memory bus control circuit 16.

The second hit (HIT) detection circuit 14 is a circuit for detecting the cache miss/cache hit for the branched instruction fetch address output from the second address output port FA2 of the instruction fetch unit 201 and functions to compare the block address read out from the tag memory 11 with the upper bits of the branched instruction fetch address, output a hit signal indicating the cache hit when the result of comparison indicates coincidence, and output a miss hit signal indicating the cache miss when the result of comparison indicates non-coincidence. Like the signal from the hit (HIT) detection circuit 13, the signal is supplied to both of the microprocessor control circuit 15 and memory bus control circuit 16.

The microprocessor control circuit 15 and memory bus control circuit 16 respectively effect the wait control of the instruction fetch unit 201 and the access control of the instruction memory 12 and main memory 30.

For example, when a conditional branch instruction is fetched to the instruction fetch unit 201, a contiguous instruction fetch address specifying an instruction succeeding the address of the conditional branch instruction is sequentially output from the first address output port FA1 of the instruction fetch unit 201. Then, when the branched address of the conditional branch instruction is calculated in the decode unit 202, a branched instruction fetch address is output from the second address output port FA2 of the instruction fetch unit 201. At this time, a contiguous instruction fetch address specifying a second succeeding instruction from the conditional branch instruction is simultaneously output from the first address output port FA1 of the instruction fetch unit 201.

When the cache hit occurs in both of the contiguous instruction fetch address and branched instruction fetch address which are simultaneously output, the memory bus control circuit 16 determines that both of the two instructions of the data memory 12 are valid and controls the data memory 12 so as to permit the instructions to be read out to the instruction input ports I1, I2 of the instruction fetch unit 201. In this case, since the wait control of the instruction fetch unit 201 by the microprocessor control unit 15 is not effected, readout of two instructions which may be executed, that is, the contiguous instruction and branched instruction can be effected and completed in one cycle.

On the other hand, when a cache miss occurs in one or both of the fetch addresses, the cache refill for the address in which the cache miss occurs is executed. In this case, the cache refill indicates the operation of transferring data from the main memory 30 to the instruction cache 300 at the time of occurrence of cache miss to exchange the cache contents, that is, the contents of the tag memory 11 and data memory 12.

That is, if the cache miss occurs in one or both of the fetch addresses, the microprocessor control circuit 15 functions to set the instruction fetch unit 201 into the wait state and the memory bus control circuit 16 functions to fetch an instruction from the main memory 30 to the cache via the memory bus 31 so as to effect the cache refill.

when the cache miss occurs in both of the contiguous instruction fetch address and branched instruction fetch address, the memory bus control circuit 16 preferentially effects the cache refill for the branched instruction fetch addresses.

Next, the operation of fetching an instruction from the 2-port instruction cache 300 shown in FIG. 2 is explained with reference to FIGS. 3A to 3K and FIGS. 4A to 4R.

In FIGS. 3A to 3K, the timing (FIGS. 3F to 3K) of the instruction fetch operation of the CPU core unit 200 effected in a case where the 2-port instruction cache 300 is used is shown in comparison with the timing (FIGS. 3A to 3E) of the operation effected in a case where the conventional 1-port instruction cache is used.

The instruction fetch operation timing is set for a case wherein the CPU core unit 200 sequentially executes the condition code changing instruction (which is hereinafter referred to as an MCC instruction) and conditional branch instruction in a 4-stage pipeline constructed by an instruction fetch stage (F), decode stage (D), execution stage (E) and data write-in stage (w).

Whether the branch condition of the conditional ranch instruction is taken or untaken is determined when the condition code of the MCC instruction is determined. The condition code of the MCC instruction is determined in the data write-in stage (W) of the fourth cycle of the MCC instruction.

Therefore, two instructions are inserted as shown in FIGS. 3C and 3D. The inserted instructions depend on the microprocessor which executes the conditional branch instruction. That is, when the conditional branch instruction is executed, an instruction (which has an address smaller than the conditional branch instruction) which is to be executed before the conditional branch instruction is executed in the microprocessor using the delayed branch system. Further, In the microprocessor which does not use the delayed branch instructions shown in FIGS. 3C and 3D are canceled later.

On the other hand, when the 2-port instruction cache 300 of this invention is used as shown in FIGS. 3F to 3K, both of the branched instruction (FIG. 3J) and the contiguous instruction (FIG. 3I) which may be executed can be simultaneously read out. Therefore, fetches of the contiguous instruction and branch instruction are executed in parallel at the same time as determination of the condition code without waiting for the condition code to be determined in the fourth cycle of the MCC instruction (FIG. 3F). After this, in the cycle 5, a contiguous/branched instruction can be decoded according to the result of determination in the cycle 4 as to whether the branch is taken or untaken. Therefore, only one instruction will be inserted and the performance of the CPU can be enhanced. The same embodiment can be applied irrespective of whether the microprocessor uses the delayed branch system or not.

In FIGS. 4A to 4R, the timing indicating the instruction fetch operation in a case where the CPU core unit 200 is a super scalar type CPU is shown.

The super scalar type CPU has a plurality of pipelines for fetching two instructions at one time from the instruction cache 300 and simultaneously executing them and thus the performance thereof is enhanced.

An example in which an MCC instruction and a conditional branch instruction are simultaneously fetched is explained.

As described before, whether the branch condition of the conditional branch instruction is taken or untaken is determined when the condition code of the MCC instruction is determined. The condition code of the MCC instruction is determined in the data write-in stage (w) in the fourth cycle of the MCC instruction.

Therefore, if the conventional 1-port instruction cache is used, the branched address of the conditional branch instruction (FIG. 4B) is calculated in the cycle 2, but the fetch of the branched instruction (FIG. 4I) is waited till the cycle 5. In this case, since the conditional branch instruction is fetched in the cycle 1 at the same time as the fetch of the MCC instruction (FIG. 4A), instructions of three cycles (instructions 1 to 6) of the cycles 2, 3, 4 are inserted.

In this case, the inserted instructions are also dependent on the microprocessor which executes the conditional branch instruction like a case which is explained with reference to FIGS. 3A to 3K. Further, the same embodiment shown in FIGS. 4K to 4R can be applied irrespective of whether the microprocessor uses the delayed branch system or not.

On the other hand, when the 2-port instruction cache 300 of this invention is used, both of the branched instruction and the contiguous instruction which may be executed can be simultaneously read out. Therefore, in this example, since a next instruction series (contiguous instruction 1, contiguous instruction 2) Of the conditional branch instruction and a branched instruction series (branched instruction 1, next instruction of the branched instruction 1) can be fetched in the cycle 3 by use of the two ports of the instruction cache 300, the fetch is already completed in the cycle 4 in which the condition code is determined and the decoding operation of one of the contiguous and branched instructions can be started. In this case, the delay instruction of only one cycle is inserted (delay instruction 1, delay instruction 2) and the performance of the CPU can be enhanced.

Figure 15:
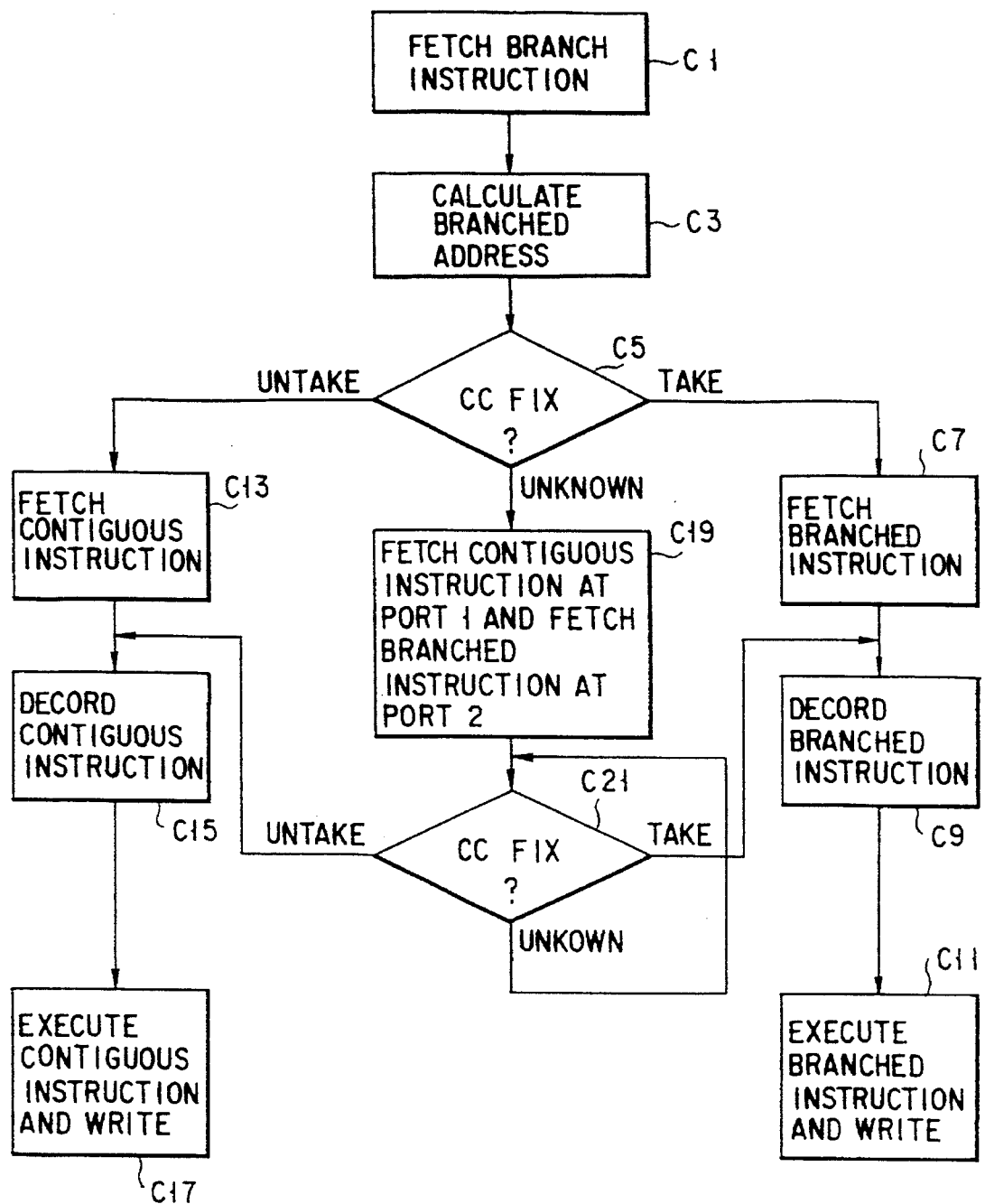
FIG. 15 is a flowchart for explaining a process after the MCC instruction and the conditional branch instruction are fetched in the instruction cache shown in FIG. 2.

In this case, a process effected after an MCC instruction and conditional branch instruction are fetched in the same embodiment is explained with reference to FIG. 15. In the same flowchart, only the process for the conditional branch instruction, conditional branched instruction and contiguous instruction is shown and the process for the other instructions is omitted.

A branched address is derived by fetching and decoding a conditional branch instruction (steps C1 and C3). After this, a condition code is determined, and if the branch condition is taken ("take" in the step C5), an instruction corresponding to the branched address is fetched via the instruction input port I2, decoded and executed, and data may be further written in a preset position according to the contents of some instructions (step C7, C9, C11).

If the condition code is determined and the branch condition is untaken ("untake" in the step C5), an instruction for the contiguous address is fetched via the instruction input port I1, decoded and executed, and data may be further written in a preset position according to the contents of some instructions (step C13, C15, C17).

In a case where the condition code is not yet determined ("unknown" in the step C5) after the step C3, an instruction for the contiguous address is fetched from the instruction input port I1 and a branched instruction for the branched address is fetched from the instruction input port I2 (step C19).

In a case where the condition code is determined and the branched condition is taken ("take" in the step C21) after the step C19, a branched instruction fetched from the instruction input port I1 is executed, and if necessary, data is written in a preset position (steps C9, C11). Further, if the condition code is determined and the branch condition is untaken ("untake" in the step C21), the contiguous instruction fetched via the instruction input port I1 is executed, and if necessary, data is written in a preset position (steps C15, C17).

After the step C19, both of the contiguous instruction and branched instruction decoded in the step C23 are kept in the same state ("unknown" in the step C24) until the condition code is determined and whether the branch condition is taken/untaken is determined.

According to the above flow, the process after the MCC instruction and conditional branch instruction are fetched is effected.

As described above, if the instruction cache 300 of this invention is used, enhancement of the performance by at least two to three cycles can be attained at the time of execution of one conditional branch instruction. Since the conditional branch instruction is often used during the loop processing, the processing time for the entire loop processing operation can be shortened by machine cycles of a number corresponding to the number of loop processings.

In the example shown in FIGS. 3A to 3K and FIGS. 4A to 4R, after execution of the conditional branch instruction, a valid instruction which should be executed before the conditional branch instruction is effected if the delayed branch system is applied to the microprocessor, and an instruction to be canceled later is executed if the delayed branch system is not used (FIG. 3H and FIGS. 4M and 4N). However, it is possible to execute the contiguous instruction immediately after the conditional branch instruction. The timings of the operation of fetching an instruction which is to be executed following the conditional branch instruction immediately after execution of the conditional branch instruction are shown in the timing chart of FIGS. 5A to 5E.

As shown in FIGS. 5A to 5E, in this example, an instruction (contiguous instruction 1; FIG. 5C) next to the conditional branch instruction is fetched in parallel with calculation of the branched address in the cycle 3 and fetch of a second succeeding instruction (contiguous instruction 2; FIG. 5D) from the conditional branch instruction and fetch of the branched instruction are simultaneously effected in the cycle 4.

In this case, if the branch condition is taken, the conditional branch instruction is decoded in the cycle 5, but if the branch condition is untaken, a process for returning a to-be-executed object to the contiguous instruction 1 fetched in the cycle 3 and then the contiguous instruction 1 is decoded.

Next, the cache refill operation of the 2-port instruction cache 300 is explained with reference to FIGS. 6A and 6B.

If, in the accessing process of the 2-port instruction cache 300, a cache miss occurs in both of the access of the contiguous instruction to be executed via the port 1 and the access of the contiguous instruction to be executed via the port 2, the memory bus control circuit 16 first effects the cache refill process of the branched instruction as shown in FIG. 6B and then effects the cache refill process of the contiguous instruction shown in FIG. 6A.

Generally, in a code output by use of the compiler, the branch condition of the conditional branch instruction is taken in most cases and the contiguous instruction will be cancelled in many cases even if it is fetched. This is because conversion of the loop process is often effected such that completion of the loop process will be determined when the condition of the conditional branch is untaken in a case where the high level compile mechanically converts the loop process.

Therefore, if the refill of the branched instruction is preferentially effected, it is determined that the branch condition is taken during the refill process, and immediately after this, a correct branched instruction can be read out. In this case, since the contiguous instruction is cancelled even if it is fetched, no problem will occur even if the refill for the contiguous instruction is delayed.

Figure 12:
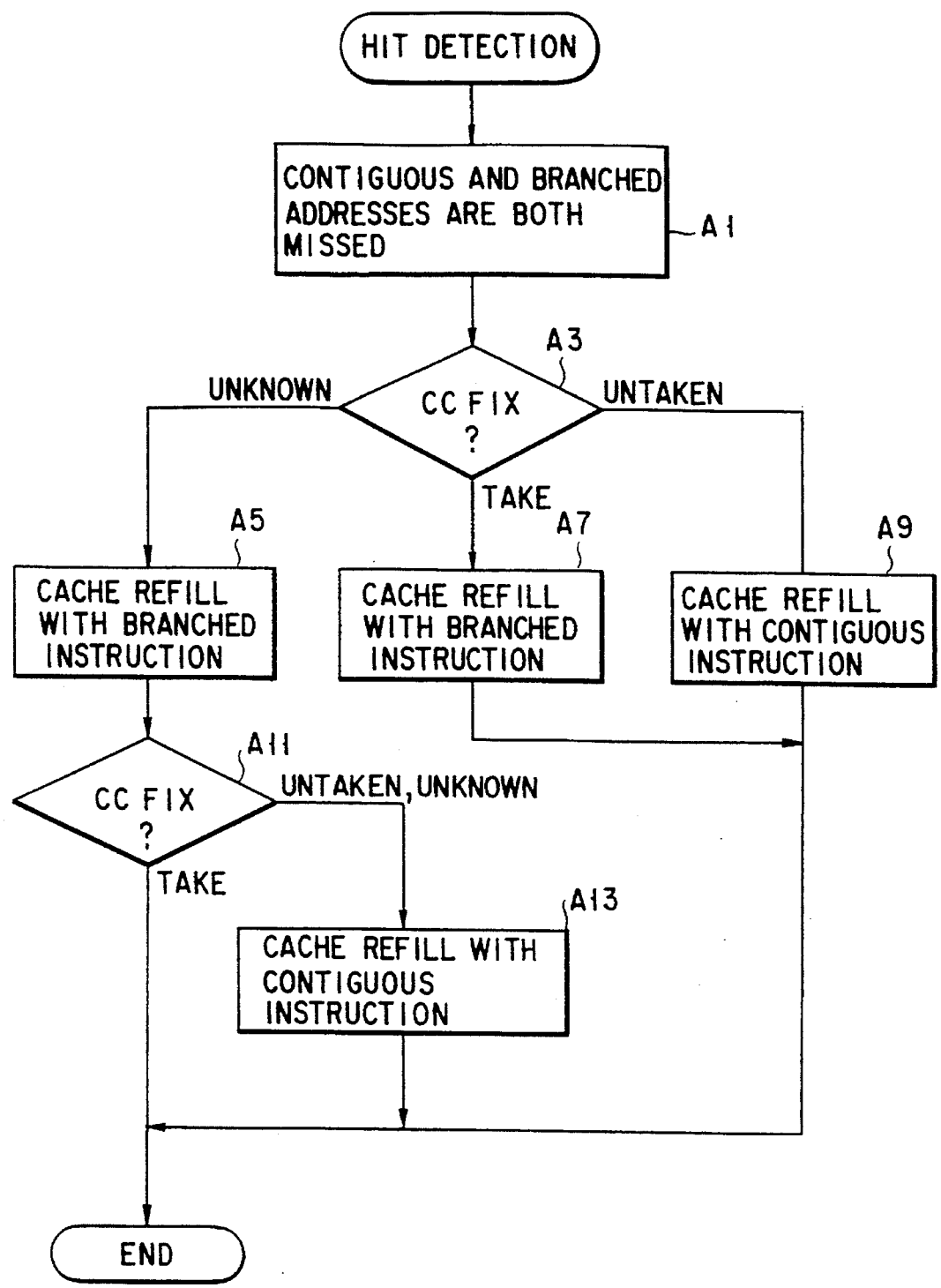
FIG. 12 is a flow chart for explaining a cache refill operation in response to condition code fixation of the instruction cache shown in FIG. 2.

Now, the execution order of cache refill for determination of the condition code when a miss hit occurs in both of the branched instruction and contiguous instruction in the same embodiment is explained with reference to the flowchart of FIG. 12.

In this example, it is assumed that a conditional branch instruction is fetched after the MCC instruction or both of the MCC instruction and conditional branch instruction are fetched by a super scalar type microprocessor. When a miss hit occurs in both of the contiguous instruction and branched instruction corresponding to the conditional branch instruction (step A1), a condition code is determined and then whether the branch is taken or untaken is checked (step A3).

In this case, if the condition code is not yet determined (unknown), the cache refill for the branched instruction is executed (step A5). On the other hand, if the condition code is determined and the branch is taken (take), the cache refill for the branched instruction is executed (step A7), and the process for the cache refill is completed. Further, if the condition code is determined and the branch is untaken (untake), the cache refill for the contiguous instruction is executed (step A9), and the process for the cache refill is completed.

After the cache refill for the branched instruction is executed (step A3, untaken, step A5) in a state that the condition code is not determined, the condition code is again determined and whether the branch is taken or untaken is checked (step A11), and if the branch is taken, the process for the cache refill is completed.

In the step A11, if the branch is untaken or the condition code is not yet determined, the cache refill for the the contiguous instruction is executed (step A13) and the process for the cache refill is completed.

The branched instruction can be read out immediately after the branch instruction is taken by preferentially executing the cache refill for the branched instruction according to the above-described flow.

As described above, in the 2-port instruction cache 300 of this invention, the port 1 is exclusively used for contiguous instruction access and the port 2 is exclusively used for branched instruction access of the conditional branch instruction. Therefore, when the CPU core unit 200 executes the conditional branch instruction, the CPU core unit 200 can simultaneously read an instruction which may be next executed by use of the two ports of the instruction cache 300 irrespective of whether the branch condition is taken or untaken. As a result, occurrence of penalty at the time of prediction failure becomes less in comparison with a case of the conventional branch prediction and the hardware can be prevented from being complicated in structure in comparison with the branch instruction buffer mechanism.

In this example, a case wherein the port 2 is used only for readout of the branched instruction of the conditional branch instruction is explained, but in this invention, since it is important to separate the readout port for the branched instruction of the conditional branch instruction and the readout port for the contiguous instruction from each other, it is of course possible to use the port 2 to read out the branched instructions of all of the branch instructions and use the port 1 to read out the other contiguous instructions irrespective of the conditional branch instruction or unconditional branch instruction.

Next, a first embodiment of the data cache 400 for attaining the high-speed cache refill which is a second feature of this invention is explained.

FIG. 7 shows an example of the concrete construction of the data cache 400.

The data cache 400 is a 2-port cache and supports the cache operation corresponding to two memory access instructions (load/store instructions) which are simultaneously executed by the execution unit 203 of the microprocessor 100. The data cache 400 includes a tag memory 21, data memory 22, first and second hit (HIT) detection circuits 23, 24, microprocessor control circuit 25, memory bus control circuit 26, first and second subtracters 27, 28, and serial access control circuit 29.

In the case of a super scalar type CPU, the execution unit 203 can simultaneously execute the two memory load/store instructions as described before. At this time, the execution unit 203 simultaneously outputs two types of memory addresses (address 1, address 2) via two address output ports A1, A2 and simultaneously effects the input/output of two types of data items (data 1, data 2) via two data input/output ports D1, D2.

The tag memory 21 is used as a directory memory for specifying an address of the main memory 30 corresponding to data stored in the data memory 22. The tag memory 21 includes entries of the same number as the number of entries (block number) of the data memory 22 and a block address, valid bit and the like are stored in each entry. The block address indicates data of a block in the main memory 30 which corresponds to data of the corresponding data of the data memory 22. The valid bit indicates whether data of the corresponding block of the data memory 22 is valid or not.

The tag memory 21 is a 2-port memory and can simultaneously receive two types of memory addresses output from the execution unit 203. That is, the lower bits of the two types of memory addresses 1, 2 output from the execution unit 203 are input to the tag memory 21 and two types of block addresses stored in the entries specified by the addresses are simultaneously read out.

The data memory 22 is a memory for holding part of data of the main memory 30 and has entries (blocks) of the same number as the number of entries of the tag memory 21. The data memory 22 is also a 2-port memory and can simultaneously receive two types of memory addresses output from the execution unit 203. That is, the lower bits of the two types of memory addresses 1, 2 output from the execution unit 203 are input to the data memory 22 and block data items of the entries specified by the addresses are to be read out or written.

The first hit (HIT) detection circuit 23 is a circuit for detecting the cache miss/cache hit for the memory address 1, and compares the upper bit addresses of the memory address 1 and the block address read out from the tag memory 21, outputs a hit signal indicating the cache hit when the result of comparison indicates coincidence, and outputs a miss hit signal indicating the cache miss when the result of comparison indicates non-coincidence. The signal is supplied to both of the microprocessor control circuit 25 and memory bus control circuit 26.

The second hit (HIT) detection circuit 14 is a circuit for detecting the cache miss/cache hit for the memory address 2, and compares the upper bit addresses of the memory address 2 and the block address read out from the tag memory 21, outputs a hit signal indicating the cache hit when the result of comparison indicates coincidence, and outputs a miss hit signal indicating the cache miss when the result of comparison indicates non-coincidence. Like the signal from the hit (HIT) detection circuit 23, the signal is supplied to both of the microprocessor control circuit 25 and memory bus control circuit 26.

The microprocessor control circuit 25 and memory bus control circuit 26 respectively effect the wait control of the execution unit 203 and the access control of the cache and main memory 30.

For example, when a cache hit occurs in both of the memory access instructions to be simultaneously executed, the memory bus control circuit 26 determines that both of the two block data items of the data memory 22 are valid and controls the data memory 22 so that the block data items can be read out or written. In this case, since the wait control of the execution unit 203 by the microprocessor control circuit 25 is not effected, two memory access instructions are executed and completed in one cycle.

On the other hand, when a cache miss occurs in one or both of the memory access instructions, cache refill is effected. In this case, the cache refill indicates the operation of transferring data from the main memory 30 to the cache memory at the time of occurrence of cache miss to exchange the cache contents, that is, the contents of the tag memory 21 and data memory 22.

That is, if the cache miss occurs in one or both of the addresses, the microprocessor control circuit 25 functions to set the execution unit 203 into the wait state and the memory bus control circuit 26 functions to fetch data from the main memory 30 to the cache via the memory bus 31 so as to effect the cache refill.

The cache refill operation by the memory bus control circuit 26 is controlled by a serial access control signal. The serial access control signal specifies the block transfer in which a smaller one of the memory addresses 1, 2 is set as a top address and a size corresponding to an address difference between the memory addresses 1, 2 is set as the data transfer length. The data block transfer is attained by use of a DMA transfer control circuit 261 provided in the memory bus control circuit 26.

For example, when the main memory 30 is constructed by a DRAM (dynamic random access memory), the block transfer in which a size corresponding to the address difference is set as the data transfer length is effected by the burst transfer of the DRAM.

The serial access control signal is created by use of the first and second subtracters 27, 28 and serial access control circuit 29.

The first subtracter 27 is a circuit for deriving a difference between the values of the memory address 1 and the memory address 2 and the relation between the magnitudes of the address values, and subtracts the memory address 2 from the memory address 1 and outputs result-of-subtraction data A (absolute value) and first magnitude signal. The first magnitude signal is set to "1" when the value of the memory address 1 is smaller than the value of the memory address 2 and set to "0" when the value of the memory address 2 is smaller than the value of the memory address 1. The first magnitude signal is supplied to the serial access control circuit 29. The result-of-subtraction data A indicates a difference between the address values of the memory address 1 and memory address 2 and is supplied to the second subtracter 28 and serial access control circuit 29.

The second subtracter 28 is a circuit for detecting whether the address difference indicated by the result-of-subtraction data A is equal to or less than a predetermined value B, and functions to subtract the result-of-subtraction data A from the predetermined value B, output a second magnitude signal of "1" when the result-of-subtraction data A is not larger than the predetermined value B and output a second magnitude signal of "0" when the result-of-subtraction data A is larger than the predetermined value B. The second magnitude signal is supplied to the serial access control circuit 29.

The magnitude of the predetermined value B corresponds to the upper limit of the data size which can be transferred and is defined by the physical structure of the main memory 30, the memory capacity of the data memory 22 and the like.

The serial access control circuit 29 generates a serial access control signal according to the first magnitude signal and result-of-subtraction data A when the result-of-subtraction data A is not larger than the predetermined value B (second magnitude signal ="1"). That is, the serial access control circuit 29 detects a memory address which is a smaller one of the addresses 1, 2 based on the first magnitude signal and generates a serial access control signal specifying the block transfer in which the detected memory address is set as a top address and an address difference indicated by the result-of-subtraction data A is used as the data transfer length (number of transfer words).

Next, the cache refill operation of the first embodiment is explained with reference to FIGS. 8A and 8B and FIG. 9.

The lower addresses of the memory addresses 1, 2 are supplied to the tag memory 21 of the data cache 400 and the data memory 22. An output value (block address) of the tag memory 21 and the upper addresses of the memory addresses 1, 2 are compared by the hit (HIT) detection circuits 23, 24 and signals indicating the cache hit/cache miss are output.

On the data memory 22 side, the read/write operation is effected for a memory portion addressed by the lower addresses of the memory addresses 1, 2.

If a cache miss occurs in both of the two memory access instructions simultaneously executed, data transfer from the main memory 30 to the data memory 22 is effected by the memory bus control circuit 26 to effect the cache refill operation.

At this time, if the memory addresses 1, 2 are addresses having approximately equal values (result-of-subtraction data A predetermined value B) and the value of the memory address 1 is smaller than that of the memory address 2, block transfer in which the memory address 1 is set as a top address and a size corresponding to an address difference between the memory address 2 and the memory address 1 is set as the data transfer length is effected.

For example, when the values of the memory addresses 1, 2 are successive block addresses, the value (A0) of the memory address 1 which is a smaller one of the two memory addresses 1, 2 on which the cache miss has occurred is set as a top address of the block transfer and the data transfer length becomes two words as shown in the cache refill bus cycle (bus cycle 1) in FIG. 8.

In this case, when the bus 31 is once acquired, data items (data items D0 to D3 corresponding to the memory address 1 and data items D4 to D7 corresponding to the memory address 2) corresponding to two memory addresses are then successively transferred from the main memory 30.

Further, in a case where a plurality of data blocks are contained between the memory address 1 and the memory address 2, the value (A0) of the memory address 1 which is a smaller one of the two memory addresses 1, 2 on which the cache miss has occurred is set as a top address of the block transfer and the data block in the range from the memory address 1 to the memory address 2 is set as the data transfer length as shown in the cache refill bus cycle (bus cycle 2) in FIG. 8. Also, in this case, when the bus 31 is once acquired, data items from the data corresponding to the memory address 1 to the data corresponding to the memory address 2 are then successively transferred from the main memory 30. In an example of FIG. 8, since two data blocks are contained between the memory address 1 and the memory address 2, not only the data items D0 to D3 corresponding to the memory address 1 and data items D12 to D15 corresponding to the memory address 2 but also two data blocks (D4 to D7, D8 to D11) contained therebetween are read out.

FIG. 9 shows an example of a memory area of the main memory 30 to be subjected to the block transfer. When an address difference between the memory addresses 1 and 2 is smaller than the predetermined value B, all of the data blocks between the addresses are read out from the main memory 30 and transferred to the data memory 22.

Figure 16:
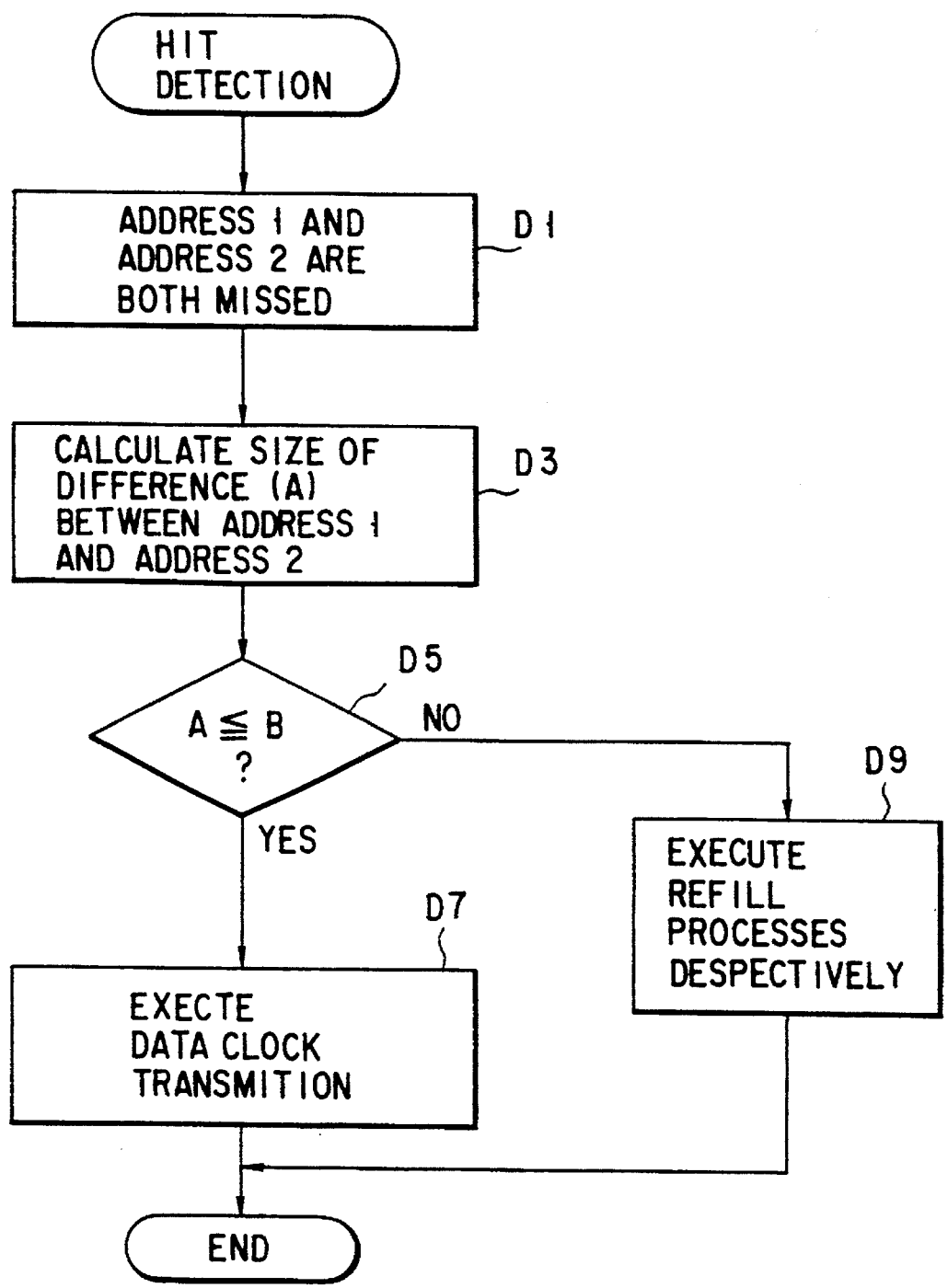
FIG. 16 is a flowchart for explaining a operation when two addresses output from the execution unit are both missed in the data cache shown in FIG. 7.

The operation up to the block transfer process described above is shown in the flowchart of FIG. 16.

In a case where a miss hit occurs in both of the address 1 and address 2, that is, cache miss signals are output from both of the hit detection circuits 23, 24 (step D1), a difference (A) between the address 1 and the address 2 is derived (step D3). However, the value A is calculated so as to become an integer. Further, the difference between the address 1 and the address 2 is derived, and at the same time, the magnitude relation between the address 1 and the address 2 is calculated.

After this, whether the value A is not larger than a value B or not is determined (step D5). At this time, the value B indicates an upper limit of block transferable data size as described before.

If the calculated value A is not larger than the value B ("YES" in the step D5) and the value of the address 1 is smaller than the value of the address 2, the block transfer in which the value of the address 1 is used as a top address and the size corresponding to the value A is set as the data transfer length is effected. Further, if the value of the address 2 is smaller than the value of the address 1, the block transfer in which the value of the address 2 is used as a top address and the size corresponding to the value A is set as the data transfer length is effected (step D7). As a result, necessary data can be obtained by one access to the main memory 30.

If the calculated value A is larger than the preset value B ("NO" in the step D5), memory accesses based on the address 1 and address 2 are independently effected (step D9).

It is generally understood that the address for memory access effected by a program has the locality with respect to time and address space. Therefore, it is safe to say that data lying therebetween will be accessed later by the execution unit 203 with high possibility. It becomes possible to prevent occurrence of a cache miss by previously fetching the above data to the data cache 400, thereby enhancing the performance.

As described above, when a cache miss occurs in both of the first and second memory access instructions in the data cache 400 of the first embodiment, but block transfer in which a memory address value which is a smaller one of the values of the first and second memory access instructions is set as a top address and a size corresponding to an address difference between the memory addresses 1 and 2 is set as the data transfer length is effected according to the address difference derived by the subtracter 27 instead of effecting accesses to the main memory 30 independently effected twice for the refill for both of them. As a result, a data block containing data corresponding to both of the first and second memory addresses is transferred by block transfer from the main memory 30 to the data memory 22 and data transfer is effected for the cache refill for both of the first and second memory access instructions by single main memory access. Thus, the main memory access is effected only once for the cache refill, and in comparison with a conventional case wherein main memory accesses are independently effected twice, the number of insertions of adjustment time necessary for acquiring the bus is reduced, thereby making it possible to considerably reduce time required for the cache refill process. As a result, the stand-by time of the microprocessor caused at the time of occurrence of a cache miss can be reduced, thus making it possible to enhance the operation performance of the microprocessor.

In this example, a case wherein an entry lying between the memory addresses 1 and 2 and having no relation to the access is simultaneously refilled is explained. However, in the first embodiment, since it is important to effect the cache refill for the two memory access instructions by a single main memory access, only data corresponding to the memory addresses 1, 2 is refilled and it is not always necessary to refill the entry lying between the memory addresses 1 and 2 and having no relation to the access.

Further, in this example, a case of MSB specification in which a memory address having a small value is set as a top address is explained, LSB specification in which a memory address having a large value is set as a top address can be used in the same manner.

Next, a second embodiment of the data cache 400 is explained with reference to FIG. 10 and FIGS. 11A to 11F.

The data cache 400 of the second embodiment is constructed such that non-cacheable access is effected without effecting the cache refill for the memory address 1 corresponding to an instruction having a high priority execution order and the cache refill is effected only for the memory address 2 corresponding to an instruction having a low priority execution order when the two memory addresses 1, 2 have different address values which compete on the same entry address of the data memory 22 and a cache miss occurs in the two memory addresses 1, 2.

In this case, the non-cacheable access means that data is directly transferred to the execution unit 203 without transferring data to the cache from the main memory 30 at the time of occurrence of cache miss.

That is, the second embodiment is constructed such that the cache refilling process for the memory address 1 is omitted to reduce time required for the entire cache refilling process accordingly.

Even if data of the data memory 22 is exchanged by the cache refill for the memory address 1 when a cache miss occurs in both of the memory addresses 1, 2 which compete on the same entry address of the data memory 22, the data is further exchanged for another data by the cache refill for the memory address 2. As a result, omission of the cache refill for the memory address 1 makes it possible to reduce time required for the entire cache refill process without causing any problem in the cache memory system.

Figure 10:
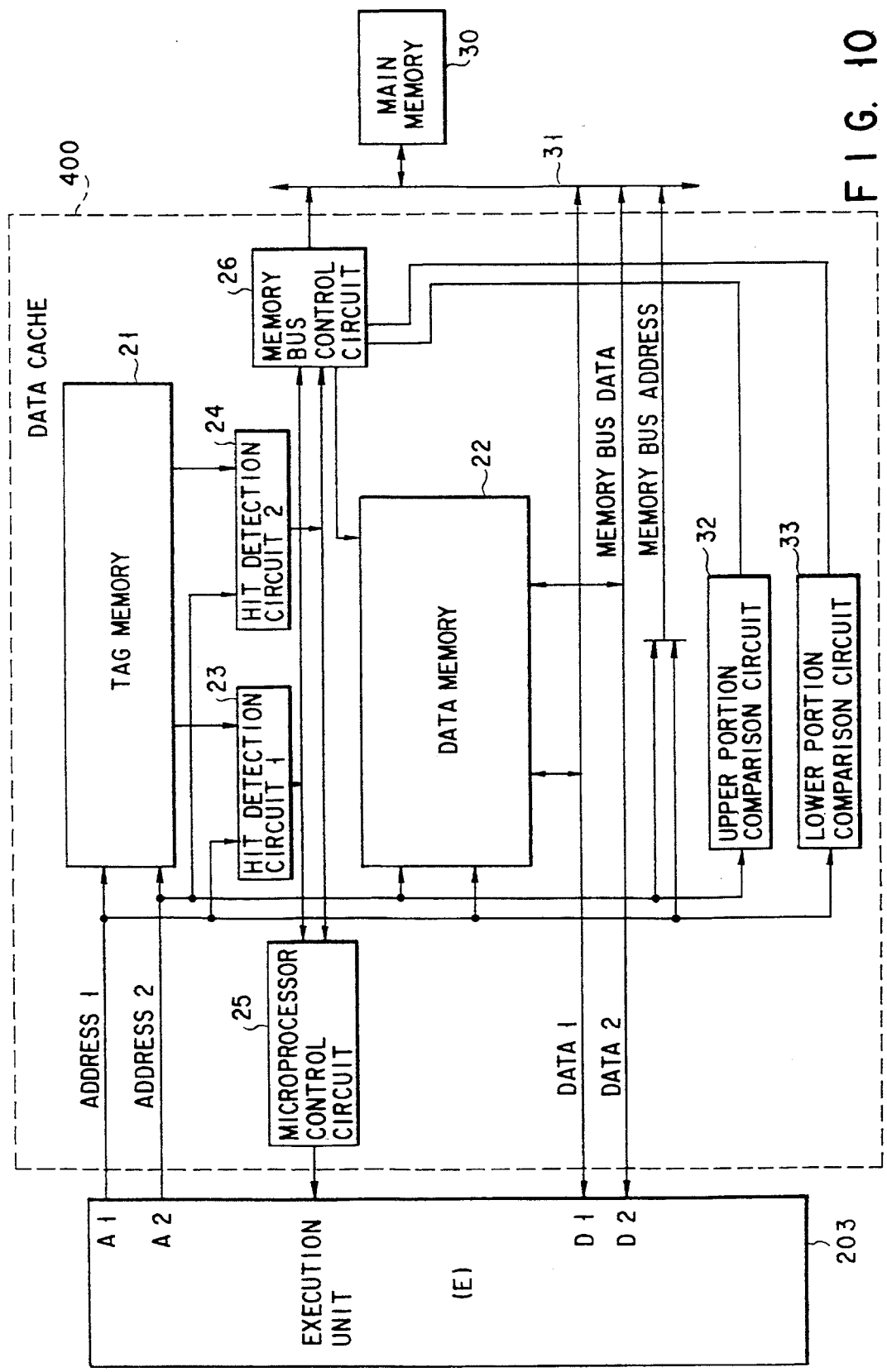
FIG. 10 is a block diagram showing another example of the concrete construction of the 2-port type data cache provided in the cache memory system shown in FIG. 1.

Next, the construction of the data cache 400 of the second embodiment is explained in detail with reference to FIG. 10.

The data cache 400 of the second embodiment constitutes a 2-port cache like the cache memory system of the first embodiment shown in FIG. 1, but it includes an upper address comparison circuit 32 and lower address comparison circuit 33 instead of the subtracters 27, 28 and serial access control circuit 29 provided in the first embodiment. The upper address comparison circuit 32 and lower address comparison circuit 33 are provided to detect whether or not two memory addresses 1, 2 have different address values which compete on the same entry address of the data memory 22.

The upper address comparison circuit 32 compares the upper bits of the memory addresses 1, 2 for each bit unit and detects whether the values of the upper bits of the memory addresses 1, 2 coincide with each other or not. A comparison result signal of the upper address comparison circuit 32 is supplied to the memory bus control circuit 26. In this case, the comparison result signal of "1" indicates that the values of the upper bits of the memory addresses 1, 2 coincide with each other and the comparison result signal of "0" indicates that the values of the upper bits of the memory addresses 1, 2 do not coincide with each other.

The lower address comparison circuit 33 compares the lower bits of the memory addresses 1, 2 for each bit unit and detects whether the values of the lower bits of the memory addresses 1, 2 coincide with each other or not. A comparison result signal of the lower address comparison circuit 33 is supplied to the memory bus control circuit 26. In this case, the comparison result signal of "1" indicates that the values of the upper bits of the memory addresses 1, 2 coincide with each other and the comparison result signal of "0" indicates that the values of the upper bits of the memory addresses 1, 2 do not coincide with each other.

The memory bus control circuit 26 functions to selectively effect the non-cacheable access and cache refill described before and whether or not the non-cacheable access is effected at the time of occurrence of cache miss is determined based on the comparison result signals of the address comparison circuits 32, 33.

That is, when the memory bus control circuit 26 detects that a cache miss occurs in both of the memory addresses 1, 2 according to signals from the hit (HIT) detection circuits 23, 24, it checks whether or not the memory addresses 1, 2 have different address values which compete on the same entry address of the data memory 22 based on the comparison result signals from the address comparison circuits 32, 33. When the memory addresses 1, 2 have different address values which compete on the same entry address of the data memory 22, the comparison result signal of the lower address comparison circuit 33 becomes "1" indicating coincidence and the comparison result signal of the upper address comparison circuit 32 becomes "0" indicating non-coincidence. Therefore, when the memory bus control circuit 26 receives the comparison result signal "1" from the upper address comparison circuit 33 and the comparison result signal "0" from the upper address comparison circuit 32, it effects the non-cacheable access which is not accompanied by the cache refill for the operand of the memory address 1 corresponding to an instruction of high priority execution order and effects the cache refill only for the operand of the memory address corresponding to an instruction of low priority execution order.

In this case, it is assumed that the execution order of the two instructions is previously determined by the specification of the processor. In this example, the memory address 1 from the first address port A1 of the core unit 20 is an address of high priority execution order and the memory address 2 from the second address port A2 is an address of low priority execution order.

Figure 11:
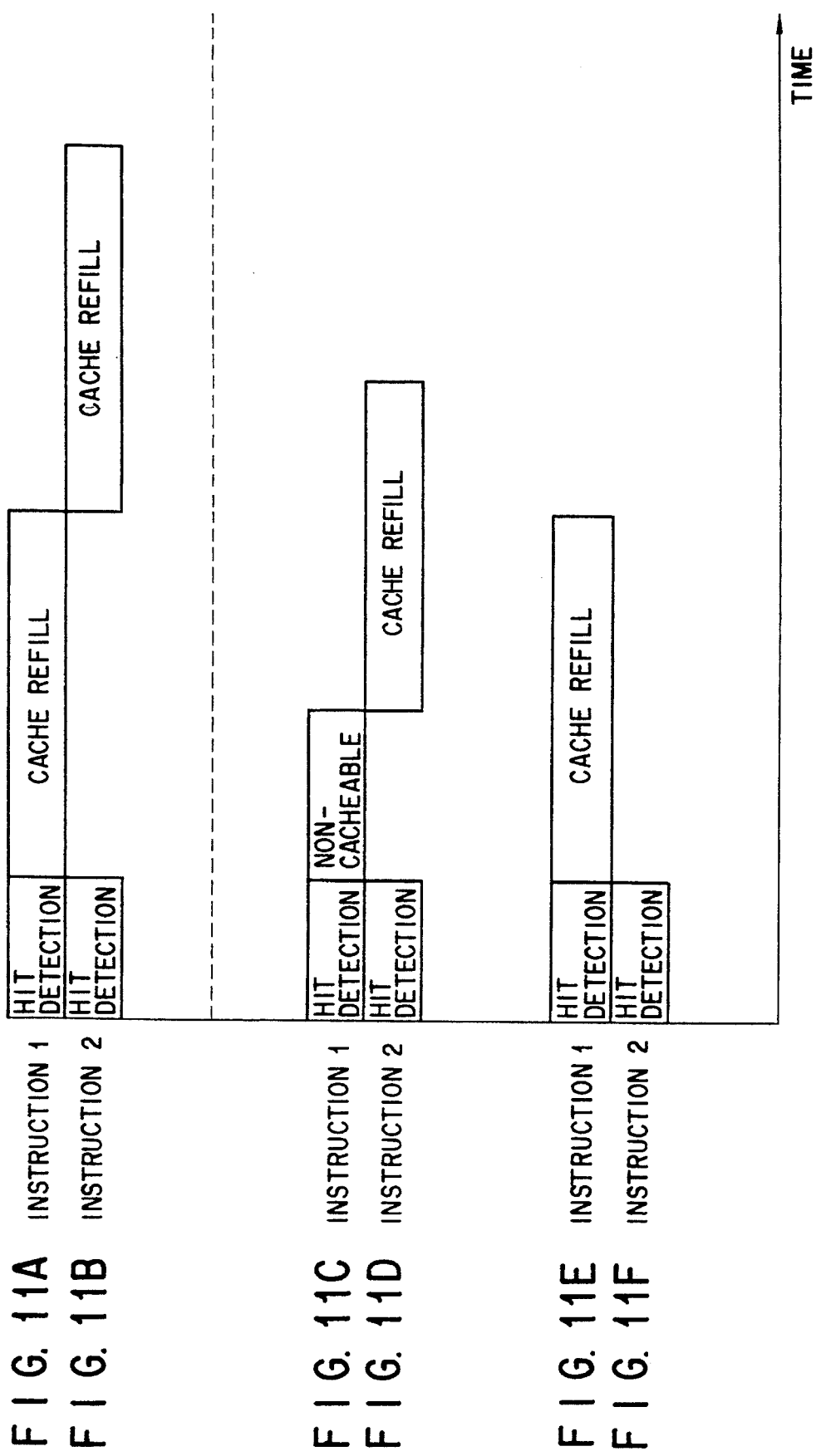
FIGS. 11A to 11F are timing charts for illustrating the cache refill operation of the 2-port type data cache shown in FIG. 10.

FIG. 11 shows the timing chart for illustrating the cache refill operation effected when a cache miss occurs in both of the memory addresses 1, 2 which compete on the same entry address of the data memory 22.

In the data cache 400 of the second embodiment, only the non-cacheable access which is not accompanied by the cache refill is executed for the memory address 1 corresponding to the instruction (instruction 1) of high priority execution order (FIGS. 11C and 11D) and data read out from the main memory 30 is directly supplied to the core unit 20 without passing through the data memory 22.

For this reason, in comparison with a conventional case wherein the cache refill is effected for each of the two instructions, time required for effecting the entire process can be reduced by an amount obtained by omitting the cache data exchanging operation for the instruction (instruction 1) of high priority execution order.

Figure 14:
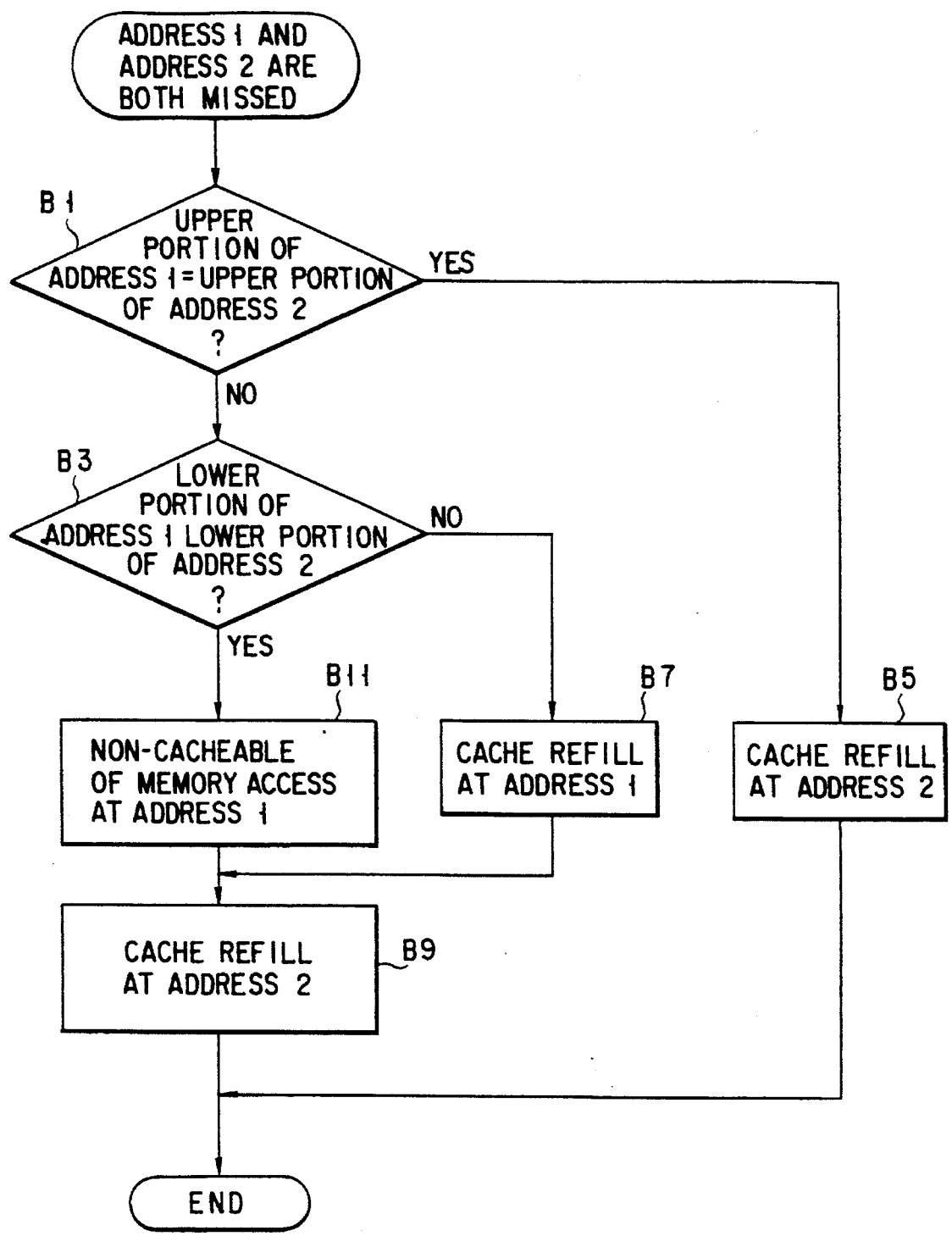
FIG. 14 is a flow chart for explaining a operation when two addresses output from the execution unit and both missed in the data cache shown in FIG. 10.

The same embodiment is further explained with reference to FIGS. 13 and 14. Also, in this case, it is assumed that the memory address 1 is an address with a high priority execution order and the memory address 2 is an address with a low priority execution order. FIG. 13 shows a rough relation between data stored in the tag memory 21 and data memory 23 in this embodiment and an address output from the execution unit 203. In this example, the address output from the execution unit 203 has 32 bits and a portion ranging from the least significant bit to a preset bit is set as an offset portion, and the remaining portion is divided into an upper portion and a lower portion. The lower portion of the address corresponds to the entry address and the upper address corresponds to the address tag.

When a miss hit occurs in both of the memory address 1 and memory address 2, the upper and lower addresses of the memory address 1 and memory address 2 are compared by means of the upper address comparing circuit 32 and the lower address comparing circuit 33, respectively, as described before (FIG. 14, steps B1 and B3). When the upper addresses are equal to each other ("YES" in the step B1), only the cache refill for the memory address 1 is executed (step B5) and the process for the cache refill is completed. The timing chart for illustrating the above process is shown in FIGS. 11E and 11F.

If both of the upper and lower addresses are different from one another ("NO" in the step B1, "NO" in the step B3), the memory addresses 1 and 2 do not compete on the same entry address, and therefore, the cache refill for the memory address 2 is effected (step B9) after the cache refill for the memory address 1 is effected (step B7). This process is the same as the conventional cache refill process shown in FIGS. 11A and 11B.

Further, if the upper addresses are different from each other and the lower addresses are equal to each other ("NO" in the step B1, "YES" in the step B3), this means that the memory addresses 1 and 2 compete on the same entry address. Therefore, the non-cacheable access is effected for the memory address 1 (step B11). After this, the cache refill is effected for the memory address 2 (step B9). The above processes are shown in FIGS. 11C and 11D.

By the above processes, a meaningless cache refill process can be omitted. Therefore, time for the entire process can be reduced.

In the above description, explanation only for the 2-port data cache is made, but the number of memory access instructions which can be simultaneously received is not limited to two. Further, as the structure of the cache memory (way structure) and the updating system of the main memory (write through, write back), desired ones can be used.

In the above example, only the cache refill for the instruction (instruction 2) of low priority execution order is effected so as to make the content of the cache memory correspond to the newest instruction, but the process time can be reduced by effecting only the cache refill for the instruction (instruction 1) of high priority execution order. In this case, the content of the cache memory does not strictly correspond to the newest instruction, but since the instruction 1 and the instruction 2 are simultaneously executed, an effect equivalent to that obtained when it is set to correspond to the newest instruction can be expected in practice.

Further, the instruction cache 300 and data cache 400 of this invention are preferably a processor built-in type in which they are integrally formed on the same chip as the processor, but they can be realized as an externally attached cache memory system.

As described above, according to the 2-port cache system of this invention, performance degradation of the CPU caused by the conditional branch instruction can be prevented by exclusively using the first port of the instruction cache to read out a contiguous instruction and exclusively using the second port thereof to read out a branched instruction and time for the cache refill process can be reduced by the contiguous data transfer and non-cacheable access in the data cache. Therefore, the cache memory of 2-port structure can be effectively used and the performance of the CPU can be fully enhanced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A cache memory system for storing part of a group of instructions executed by a CPU, comprising:

a plural-port type instruction cache memory having a first instruction readout port for sequentially reading out instructions which are successive in an address order to said CPU and a second instruction readout port for reading out a branched instruction designated by a branch address of a conditional branch instruction to said CPU;

an instruction fetch unit for accessing said instruction cache memory wherein an instruction succeeding said conditional branch instruction in an address order and the branched instruction of said conditional branch instruction are simultaneously read out from said instruction cache memory via said first and second instruction readout ports when said conditional branch instruction is fetched to said CPU;

a first hit detection circuit for detecting the presence in said instruction cache memory of the instruction succeeding said conditional branch instruction in an address order;

a second hit detection circuit for detecting the presence in said instruction cache memory of the branched instruction of said conditional branch instruction; and a memory bus control circuit for preferentially refilling said instruction cache memory for said branched instruction when said first and second hit detection circuits have detected that neither said succeeding instruction nor said branched instruction is present in said instruction cache memory.

2. A method of controlling a cache memory system having a plural-port type instruction cache memory, comprising the steps of:

a) sequentially reading out instructions which are successive in address order via a first instruction readout port of said instruction cache memory and reading out a branched instruction designated by a branch address of a conditional branch instruction via a second instruction readout port of said instruction cache memory;

b) accessing said instruction cache memory wherein an instruction succeeding said conditional branch instruction in an address order and a branched instruction of said conditional branch instruction are simultaneously read out from said instruction cache memory via said first and second instruction readout ports, respectively, when a conditional branch instruction is fetched;

ac) detecting the presence in said instruction cache memory of the instruction succeeding said conditional branch instruction in an address order and the branched instruction of said conditional branch instruction; and d) preferentially refilling said instruction cache memory for said branched instruction when the step c) has detected that neither said succeeding instruction nor said branched instruction is present in said instruction cache memory.

\* \* \* \* \*